(12) United States Patent
Metschan et al.

(10) Patent No.: US 9,370,922 B1
(45) Date of Patent: Jun. 21, 2016

(54) SYSTEMS AND METHODS FOR STRETCH-FORMING MULTI-THICKNESS COMPOSITE SKINS

(71) Applicant: The Boeing Company, Seal Beach, CA (US)

(72) Inventors: Stephen Lee Metschan, Black Diamond, WA (US); Richard V. Phillips, Enumclaw, WA (US); Bryan Joseph Withrow, Seattle, WA (US); Lee Michael Kroeger, Federal Way, WA (US); Samuel Ray Stewart, Redmond, WA (US)

(73) Assignee: The Boeing Company, Chicago, IL (US)

( * ) Notice: Subject to any disclaimer, the term of this patent is extended or adjusted under 35 U.S.C. 154(b) by 171 days.

(21) Appl. No.: 14/218,661

(22) Filed: Mar. 18, 2014

(51) Int. Cl.
*B29C 70/38* (2006.01)
*B29C 70/54* (2006.01)
*B32B 37/18* (2006.01)

(52) U.S. Cl.
CPC .............. *B32B 37/18* (2013.01); *B29C 70/38* (2013.01); *B29C 70/541* (2013.01); *B29C 70/543* (2013.01)

(58) Field of Classification Search
CPC ...... B32B 37/18; B32B 37/182; B29C 70/38; B29C 70/30; B29C 70/34; B29C 70/541; B29C 70/543
See application file for complete search history.

(56) References Cited

U.S. PATENT DOCUMENTS

| | | | | |
|---|---|---|---|---|
| 4,875,962 A | * | 10/1989 | Breakspear | B29C 70/541 156/245 |
| 5,427,518 A | * | 6/1995 | Morizot | B29C 31/085 100/211 |
| 7,228,611 B2 | | 6/2007 | Anderson et al. | |
| 8,568,551 B2 | | 10/2013 | Brennan et al. | |
| 2009/0008825 A1 | * | 1/2009 | Eberth | B29C 31/008 264/308 |
| 2009/0145545 A1 | | 6/2009 | Brennan et al. | |
| 2009/0148647 A1 | * | 6/2009 | Jones | B29C 70/30 428/58 |

(Continued)

FOREIGN PATENT DOCUMENTS

| | | | | |
|---|---|---|---|---|
| DE | 102011056029 A1 | * | 6/2013 | ........... B25J 15/0616 |
| DE | 102013019146 A1 | * | 5/2015 | ............ B29C 65/224 |
| WO | WO 2012167853 A1 | * | 12/2012 | ........... B65H 3/0816 |

OTHER PUBLICATIONS

U.S. Appl. No. 13/693,887, filed Dec. 4, 2012, Rotter et al.

(Continued)

*Primary Examiner* — William Bell
(74) *Attorney, Agent, or Firm* — DASCENZO Intellectual Property Law, P.C.

(57) ABSTRACT

Systems and methods for stretch-forming multi-thickness composite skins are disclosed herein. The methods include locating a flexible support structure in a transition region that is defined by a charge of composite material and applying a vacuum to an interface between the charge of composite material and the flexible support structure to define a charge-support assembly. The methods also include separating the charge-support assembly from the layup surface and locating the charge-support assembly on a cure surface of a layup mandrel. The methods further include deforming the charge-support assembly on the cure surface to generate a conformed charge of composite material, releasing the vacuum, and separating the flexible support structure from conformed charge of composite material. The systems include systems that are configured to perform the methods.

20 Claims, 7 Drawing Sheets

(56) References Cited

U.S. PATENT DOCUMENTS

| | | | |
|---|---|---|---|
| 2010/0007065 A1* | 1/2010 | Reinhold | B25J 15/0052 264/511 |
| 2010/0011580 A1 | 1/2010 | Brennan et al. | |
| 2010/0068450 A1* | 3/2010 | Lloyd | B32B 3/02 428/99 |
| 2010/0320642 A1* | 12/2010 | Weimer | B29C 70/541 264/258 |
| 2013/0036922 A1* | 2/2013 | Stewart | B29C 70/38 100/35 |
| 2013/0056900 A1* | 3/2013 | Muller | B29C 70/48 264/160 |
| 2014/0193618 A1* | 7/2014 | Nelson | B29C 70/543 428/209 |
| 2014/0199153 A1* | 7/2014 | Reinhold | B65H 3/0816 414/800 |
| 2014/0367037 A1* | 12/2014 | Metschan | B32B 38/1858 156/285 |

OTHER PUBLICATIONS

U.S. Appl. No. 13/732,961, filed Jan. 2, 2013, Rotter et al.
U.S. Appl. No. 13/886,976, filed May 3, 2013, Metschan et al.
U.S. Appl. No. 13/887,006, filed May 3, 2013, Metschan et al.
U.S. Appl. No. 14/018,268, filed Sep. 4, 2013, Rotter et al.

* cited by examiner

SYSTEMS AND METHODS FOR STRETCH-FORMING MULTI-THICKNESS COMPOSITE SKINS

FIELD

The present disclosure relates to systems and methods for stretch-forming multi-thickness composite skins and more particularly to systems and methods that utilize a flexible support structure to reduce wrinkling during stretch-forming of the composite skins.

BACKGROUND

Historically, construction and/or assembly of a composite structure on a layup mandrel is a serial process that involves sequentially forming a plurality of support structures, such as stringers and/or spacers, on a surface of the layup mandrel, followed by locating a continuous, or at least substantially continuous, length of composite fibers around the surface of the layup mandrel to form a skin of the composite structure. This locating may be accomplished by wrapping the length of composite fibers around the surface of the layup mandrel, such as by rotating the layup mandrel with respect to a layup head that dispenses the length of composite fibers and/or by moving the layup head relative to the layup mandrel.

Generally, the support structures are formed from a plurality of plies, or layers, of a composite material, such as a pre-preg (or pre-impregnated) material, and each layer of the plurality of layers may be applied individually and/or sequentially to the surface of the layup mandrel. Similarly, the skin typically includes a plurality of layers, with each layer of the plurality of layers being applied individually and/or sequentially to the surface of the layup mandrel.

As composite structures become larger and more complex, such as may be the case for composite barrel assemblies and/or wings for an airplane, the time required to perform the above-described serial processes becomes significant. In addition, the cost of layup mandrels for large and/or complex composite structures is substantial. Thus, there exists a need for improved systems and methods for assembling a skin of a composite structure.

SUMMARY

Systems and methods for stretch-forming multi-thickness composite skins are disclosed herein. The methods include laying up a plurality of plies of composite material on a layup surface to define a charge of composite material, locating a flexible support structure in a transition region that is defined by the charge of composite material, and applying a vacuum to an interface between the charge of composite material and the flexible support structure (and/or to the entire charge of composite material) to define a charge-support assembly. The methods also include separating the charge-support assembly from the layup surface and locating the charge-support assembly on a cure surface of a layup mandrel. The methods further include forming and/or deforming the charge-support assembly on the cure surface to generate a conformed charge of composite material, releasing the vacuum, and separating the flexible support structure from the conformed charge of composite material.

The laying up the plurality of plies includes generating a plurality of stacked plies of composite material and defining a first region that has a first number of stacked plies and a first thickness as well as a second region that has a second number of stacked plies and a second thickness that is greater than the first thickness. The deforming the charge-support assembly includes maintaining the charge of composite material in tension with, or via, the flexible support structure and resisting a relative motion among the plurality of tacked plies with, or via, the flexible support structure.

In some embodiments, the methods include locating a flexible vacuum chuck so that the flexible support structure extends between the flexible vacuum chuck and the charge of composite material. In some embodiments, the flexible support structure is defined by the flexible vacuum chuck. In some embodiments, the applying includes applying the vacuum with the flexible vacuum chuck. In some embodiments, the flexible vacuum chuck includes a selective stiffening element. In some embodiments, the methods include engaging the selective stiffening element to resist deformation of the charge-support assembly prior to the locating and disengaging the selective stiffening element prior to the deforming to permit the deforming. In some embodiments, the deforming includes deforming the flexible vacuum chuck concurrently with deforming the charge-support assembly.

In some embodiments, the laying up includes laying up such that the charge of composite material includes a first plurality of plies of composite material that extends within both the first region and the second region as well as a second plurality of plies of composite material that extends within the second region but not within the first region. In some embodiments, the second plurality of stacked plies includes a plurality of edges that defines the transition region and the resisting the relative motion includes resisting the relative motion of the plurality of edges relative to one another. In some embodiments, the resisting the relative motion includes pressing against the transition region with the flexible support structure and/or compressing the transition region with the flexible support structure.

In some embodiments, the methods further include curing the conformed charge of composite material to form a skin of/for a composite structure. In some embodiments, the methods further include locating an intermediate material between the flexible support structure and the charge of composite material. In some embodiments, the methods further include locating a base material between the charge of composite material and the layup surface.

The systems include systems that are configured to perform the methods. The systems may include the layup surface, the flexible support structure, the flexible vacuum chuck, and/or the layup mandrel.

DESCRIPTION

Figure 1:
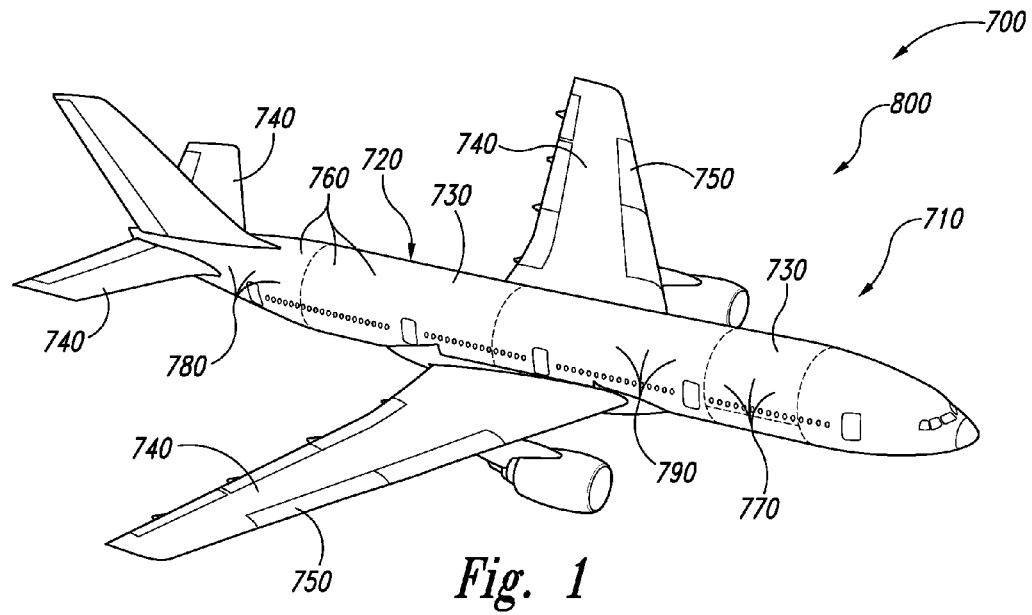
FIG. 1 is an illustrative, non-exclusive example of an aircraft that includes a composite structure that may be formed using the systems and methods according to the present disclosure.

FIGS. 1-15 provide illustrative, non-exclusive examples of composite structures 800, systems 20 for forming a non-planar skin surface contour of a skin for composite structure 800, components thereof, and/or methods of operating the same according to the present disclosure. Elements that serve a similar, or at least substantially similar, purpose are labeled with like numbers in each of FIGS. 1-15, and these elements may not be discussed in detail herein with reference to each of FIGS. 1-15. Similarly, all elements may not be labeled in each of FIGS. 1-15, but reference numerals associated therewith may be utilized herein for consistency. Elements, components, and/or features that are discussed herein with reference to one or more of FIGS. 1-15 may be included in and/or utilized with any of FIGS. 1-15 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 2:
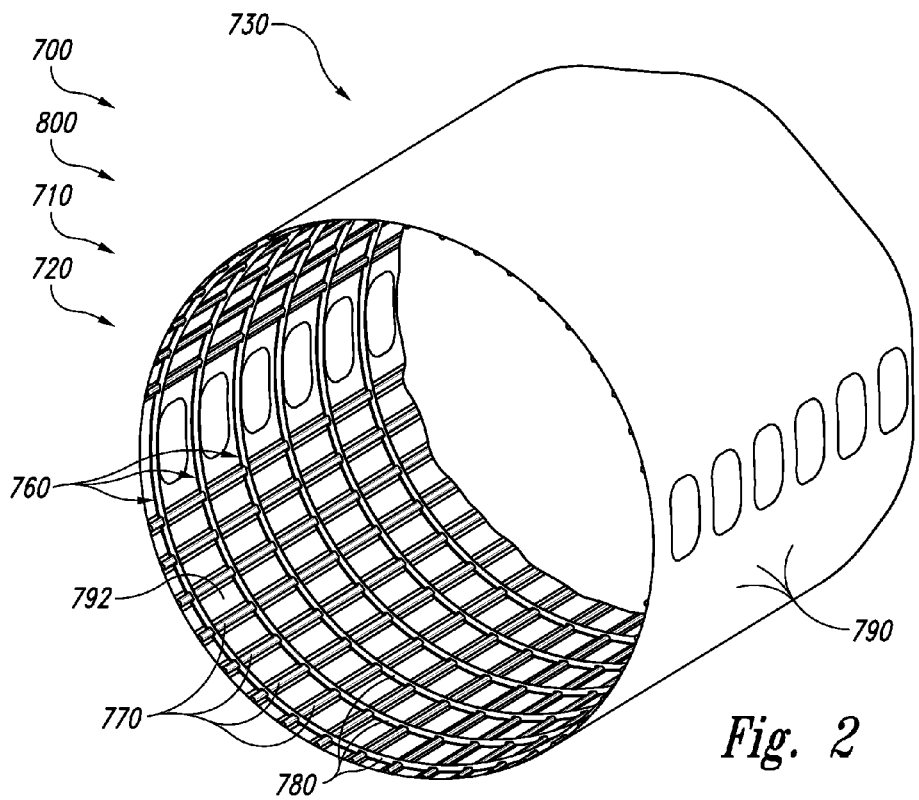
FIG. 2 is an illustrative, non-exclusive example of a fuselage barrel that may form a portion of the aircraft of FIG. 1.

FIG. 1 is an illustrative, non-exclusive example of an aircraft 700 that includes a composite structure 800 that may be formed using the systems and methods according to the present disclosure, and FIG. 2 is an illustrative, non-exclusive example of a fuselage barrel 730 that may form a portion of aircraft 700 and includes composite structure 800. Aircraft 700 and/or composite structure 800 thereof may include a plurality of skin segments 790 that may form, cover, and/or be an outer surface of any suitable portion of aircraft 700. As illustrated most clearly in FIG. 2, aircraft 700 also may include a plurality of stringers 770 that, together with a plurality of frames 780, may support an inner surface 792 of skin segments 790. A plurality of fillers 760 may extend between frames 780 and inner surface 792 and may form a portion of composite structure 800.

It is within the scope of the present disclosure that any suitable portion of aircraft 700 may be formed from and/or be composite structure 800. As illustrative, non-exclusive examples, composite structure 800 may form, or form a portion of, an airframe 710, a fuselage 720, a fuselage barrel 730, a wing 740, and/or a stabilizer 750 of aircraft 700.

Figure 3:
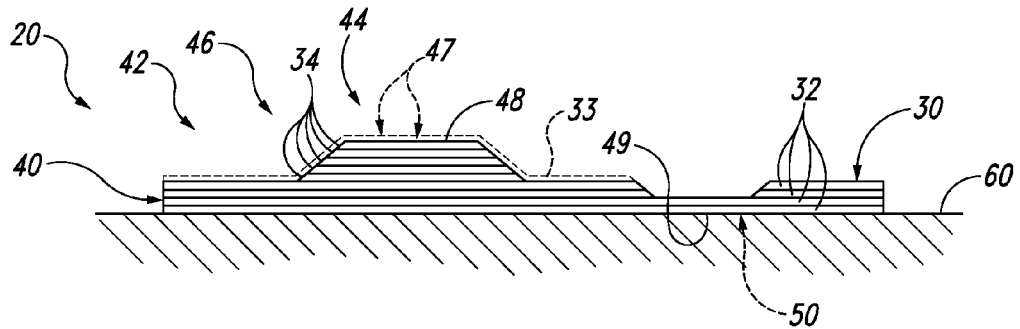
FIG. 3 is a schematic cross-sectional view of illustrative, non-exclusive examples of a charge of composite material on a layup surface.

FIGS. 3-8 provide illustrative, non-exclusive examples of a process flow that may be performed by a system 20, according to the present disclosure, for forming a non-planar skin surface contour of a skin for a composite structure 800. As illustrated in FIG. 3, system 20 may include a layup surface 60. Layup surface 60 may be configured to receive a plurality of plies 32 of a composite material 30 to form a charge 40 of composite material 30, and the process flow may include locating the plurality of plies 32 on layup surface 60 to form charge 40. Layup surface 60 may be a planar, or at least substantially planar, layup surface 60.

It is within the scope of the present disclosure that plies 32 may be may be located, placed, and/or laid up on layup surface 60 to form charge 40 in any suitable manner. As an illustrative, non-exclusive example, charge 40 may be manually laid up on layup surface 60. As another illustrative, non-exclusive example, one or more automated and/or mechanical layup tools may be utilized to locate charge 40 on layup surface 60. As yet another illustrative, non-exclusive example, charge 40 may be compacted (or vacuum compacted) one or more times during formation thereof on layup surface 60.

It is also within the scope of the present disclosure that charge 40 may include any suitable internal structure, conformation, and/or relative orientation of plies 32. As an illustrative, non-exclusive example, plies 32 may be planar, at least substantially planar, and/or may be arranged in parallel layers during formation of charge 40 and/or while charge 40 is located on layup surface 60. As another illustrative, non-exclusive example, and as illustrated in dashed lines in FIG. 3, one or more cover plies 33 may be nonplanar, may not be parallel to one or more other plies 32, may extend across one or more edges 34 of one or more other plies 32, and/or may extend within a transition region 46 that is defined between a first region 42 and a second region 44 of charge 40.

Figure 4:
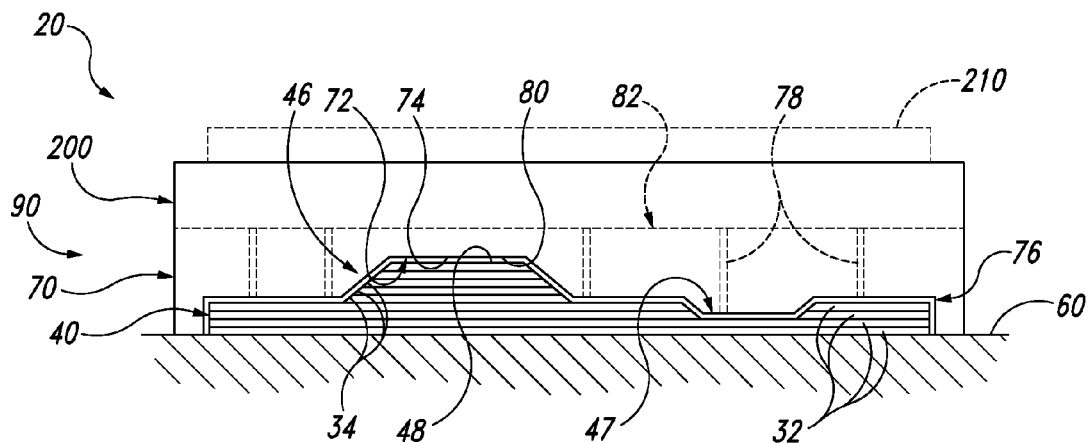
FIG. 4 is a schematic cross-sectional view of illustrative, non-exclusive examples of a charge of composite material located between a layup surface and a flexible support structure.

As illustrated in FIG. 4, system 20 further may include a flexible support structure 70 and a flexible vacuum chuck 200. Flexible vacuum chuck 200 may be utilized to selectively and operatively affix flexible support structure 70 to charge 40 to form a charge-support assembly 90. Charge-support assembly 90 then may be operatively separated and/or removed from layup surface 60 and/or transported and/or located relative to another component of system 20, as discussed in more detail herein. Additionally or alternatively, charge-support assembly 90 may be deformed during formation of a skin for a composite structure, and flexible vacuum chuck 200 and/or flexible support structure 70 may regulate and/or direct a deformation of charge 40, as also discussed in more detail herein.

Figure 5:
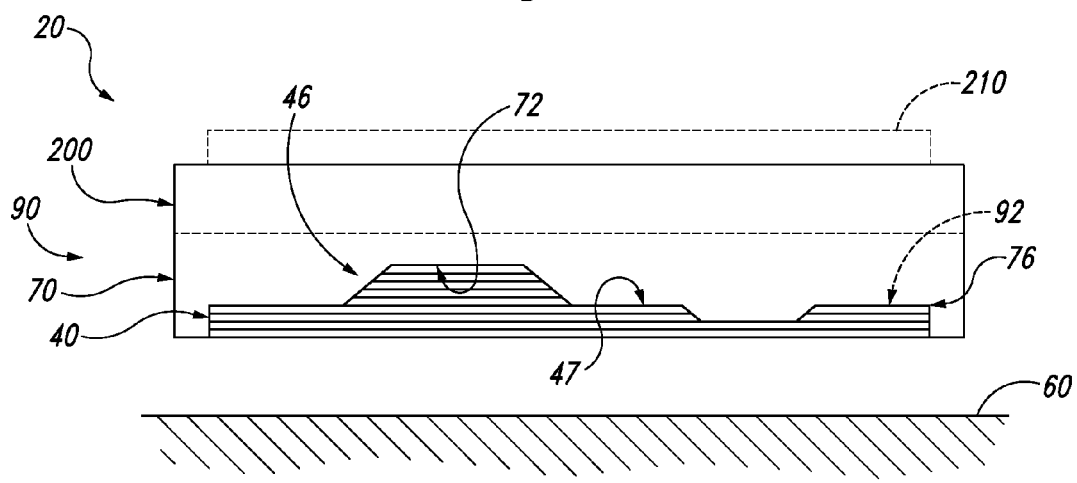
FIG. 5 is a schematic cross-sectional view of illustrative, non-exclusive examples of a charge-support assembly that has been separated from a layup surface.

As an illustrative, non-exclusive example, flexible vacuum chuck 200 may selectively apply a vacuum to an interface 76 between charge 40 and flexible support structure 70, such as via one or more vacuum conduits 78 that may be defined by flexible support structure 70, as illustrated in FIG. 4 and discussed in more detail herein. This may include applying the vacuum only to the interface, applying the vacuum to the interface and to a portion of the plurality of plies of composite material that defines the charge, and/or applying the vacuum to the interface and to the entire charge. This vacuum may, at least temporarily, operatively affix charge 40 to flexible support structure 70, forming charge-support assembly 90, and permitting charge 40 to be operatively separated from layup surface 60, as illustrated in FIG. 5.

Figure 6:
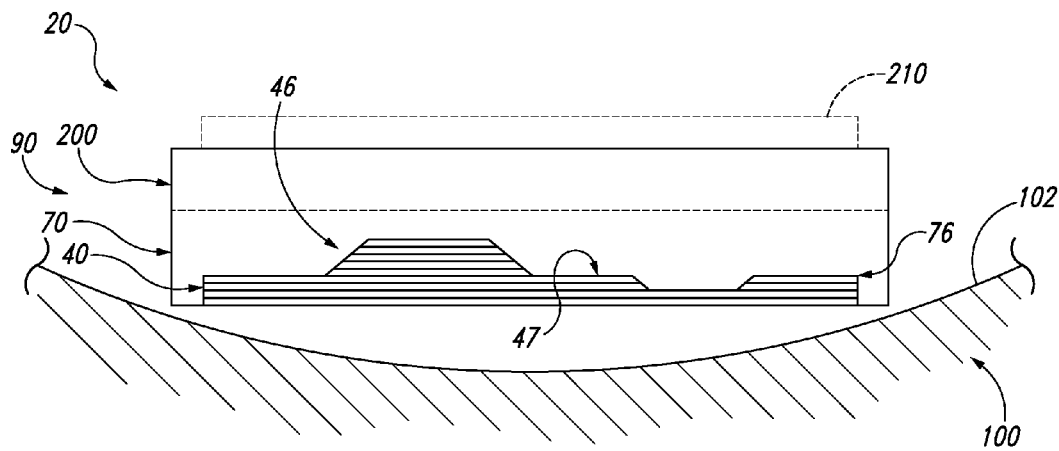
FIG. 6 is a schematic cross-sectional view of illustrative, non-exclusive examples of a charge-support assembly located on a cure surface of a layup mandrel.
Figure 7:
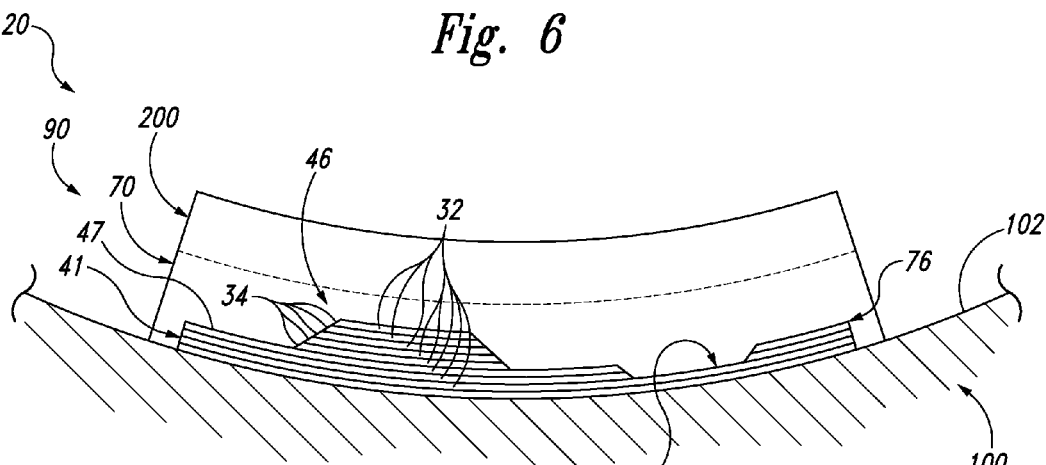
FIG. 7 is a schematic cross-sectional view of illustrative, non-exclusive examples of a charge-support assembly conformed to a non-planar cure surface contour of a cure surface.

Subsequently, and as illustrated in FIG. 6, charge-support assembly 90 may be operatively located on, near, proximal to, and/or in contact with a cure surface 102 of a layup mandrel 100, with charge 40 extending, at least substantially, between cure surface 102 and flexible support structure 70. Then, and as illustrated in FIG. 7, the charge-support assembly may be deformed, bent, strained, and/or placed in tension to conform charge 40 to a non-planar cure surface contour of cure surface 102, generating a conformed charge of composite material 41. Conformed charge of composite material 41 also may be referred to herein as a conformed charge 41 and/or as a charge 41. The non-planar cure surface contour of cure surface 102 may correspond to and/or mirror a desired non-planar skin surface contour for the skin of the composite structure. Thus, conforming charge 40 to generate conformed charge 41 may form and/or generate the desired non-planar skin surface contour in conformed charge 41. As discussed in more detail herein, flexible support structure 70 and/or flexible vacuum chuck 200 may support, direct, and/or regulate deformation of charge 40 to conformed charge 41. This may include maintaining charge 40 in tension during the deformation, preventing wrinkling of charge 40 during the deformation, and/or resisting shifting of plies 32 relative to one another during the deformation.

Figure 8:
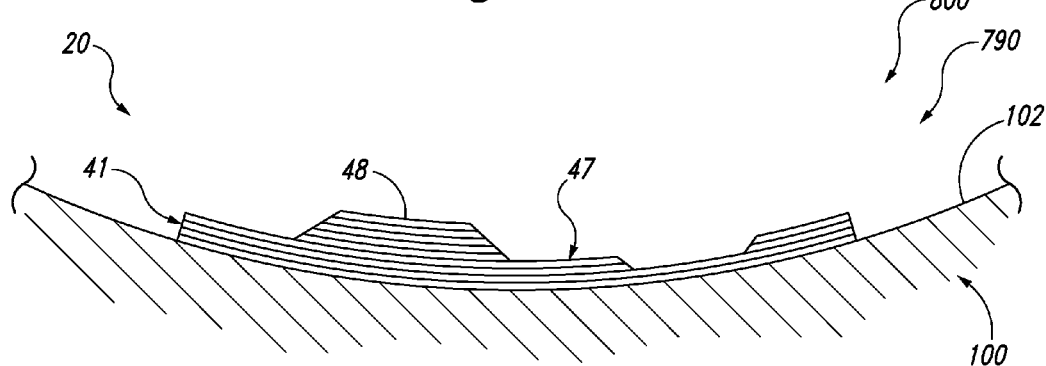
FIG. 8 is a schematic cross-sectional view of illustrative, non-exclusive examples of a charge of composite material conformed to a non-planar cure surface contour of a cure surface.

As illustrated in FIG. 8, flexible support structure 70 and flexible vacuum chuck 200 then may be separated from conformed charge 41, leaving, or retaining, conformed charge 41 on cure surface 102. As an illustrative, non-exclusive example, the vacuum that was applied by flexible vacuum chuck 200 may be released, thereby permitting separation of flexible support structure 70 from conformed charge 41. As another illustrative, non-exclusive example, flexible vacuum chuck 200 may be utilized to apply an elevated pressure at interface 76 to facilitate separation of flexible support structure 70 and conformed charge 41.

As illustrated in FIG. 3, charge 40 may define a plurality of regions, including at least first region 42 and second region 44. First region 42 may include a first number of stacked plies and may have a first thickness, a first length, and/or a first width. Similarly, second region 44 may include a second number of stacked plies and may have a second thickness, a second length, and/or a second width. The second number of stacked plies may be different from (or greater than) the first number of stacked plies. Similarly, the second thickness may be different from (or greater than) the first thickness. In addition, the first length and/or the first width may be different from (less than or greater than) the second length and/or the second width, respectively. Charge 40 also may include an exposed surface 47 that defines a non-planar exposed surface profile 48.

First region 42 and second region 44 may define transition region 46 therebetween. As an illustrative, non-exclusive example, charge 40 may include a first plurality of plies 32 of composite material 30 that may extend within both first region 42 and second region 44, as well as a second plurality of plies 32 that may extend within second region 44 but not within first region 42. The second plurality of plies 32 may define a plurality of edges 34, and these edges 34 may define (or extend within) transition region 46. Thus, transition region 46 also may be referred to herein as a transition region between two different thicknesses of charge 40 and/or a region with exposed edges 34.

It is within the scope of the present disclosure that the first number of stacked plies may include any suitable number of stacked plies. As illustrative, non-exclusive examples, the first number of stacked plies may include at least 5, at least 10, at least 15, at least 20, at least 25, at least 30, at least 35, at least 40, at least 45, and/or at least 50 stacked plies. Similarly, the second number of stacked plies may be greater than the first number of stacked plies by any suitable amount. As illustrative, non-exclusive examples, the second number of stacked plies may be at least 1.1 times, at least 1.25 times, at least 1.5 times, at least 1.75 times, at least 2 times, at least 2.5 times, at least 3 times, at least 3.5 times, at least 4 times, and/or at least 5 times the first number of stacked plies.

Additionally or alternatively, the first thickness may include any suitable thickness. As illustrative, non-exclusive examples, the first thickness may be at least 1 mm, at least 2 mm, at least 3 mm, at least 4 mm, at least 5 mm, at least 7.5 mm, at least 10 mm, at least 15 mm, and/or at least 20 mm. Similarly, the second thickness may be greater than the first thickness by any suitable amount. As illustrative, non-exclusive examples, the second thickness may be at least 1.1 times, at least 1.25 times, at least 1.5 times, at least 1.75 times, at least 2 times, at least 2.5 times, at least 3 times, at least 3.5 times, at least 4 times, and/or at least 5 times the first thickness.

The systems and methods disclosed herein may be utilized to deform charges 40 that define any suitable size, extent, surface area, characteristic dimension, and/or maximum dimension. In addition, these systems and methods may facilitate deformation of large and/or complex charges 40 that include a plurality of different regions that define a plurality of respective transition regions therebetween. As illustrative, non-exclusive examples, charge 40 may include at least 2, at least 3, at least 4, at least 5, at least 6, at least 8, at least 10, at least 15, and/or at least 20 regions with different thicknesses and/or numbers of plies that may define a corresponding number of transition regions therebetween. As another illustrative, non-exclusive example, the maximum dimension of charge 40 may be at least 5 meters, at least 10 meters, at least 15 meters, at least 20 meters, at least 25 meters, at least 30 meters, at least 35 meters, at least 40 meters, at least 45 meters, and/or at least 50 meters.

Charge 40 may define two opposed sides (such as exposed surface 47 and an interfacial surface 49, as illustrated in FIG. 3) that may define at least a threshold fraction of a total surface area of charge 40. As illustrative, non-exclusive examples, the two opposed sides may define at least 50%, at least 60%, at least 70%, at least 75%, at least 80%, at least 85%, at least 90%, at least 95%, and/or at least 99% of the total surface area of charge 40.

Charge 40 (or plies 32 thereof) may include and/or may be defined by any suitable material and/or materials. As an illustrative, non-exclusive example, charge 40 may include and/or be a plurality of fibers and a resin material. The plurality of fibers may be covered with, coated with, and/or encapsulated in the resin material. Illustrative, non-exclusive examples of the plurality of fibers include a plurality of carbon fibers, a plurality of polymeric fibers, and/or a plurality of glass fibers. Illustrative, non-exclusive examples of the resin material include an epoxy, an adhesive, and/or a polymeric resin. As more specific but still illustrative, non-exclusive examples, charge 40 (or plies 32 thereof) may include a pre-impregnated composite material, a pre-impregnated composite tape, and/or a pre-impregnated composite cloth.

As illustrated in FIG. 4, flexible support structure 70 may include a support surface 72 that defines a support surface profile 74. Support surface profile 74 may complement, correspond to, and/or mirror at least a portion of non-planar exposed surface profile 48 of charge 40. Flexible support structure 70 may be operatively located relative to charge 40 and layup surface 60 such that support surface 72 conforms to exposed surface 47. In addition, and as illustrated, flexible support structure 70 and layup surface 60 together may enclose charge 40, such as within a space, volume, and/or enclosed space that may be defined therebetween.

As illustrated in FIGS. 4-7, flexible support structure 70 may be sized, shaped, and/or located to extend within transition region 46 of charge 40 and/or to contact charge 40 within transition region 46. Thus, and during deformation of charge 40 to conformed charge 41 (as illustrated in FIGS. 6-7), flexible support structure 70 may press against transition region 46 and/or may compress a portion of transition region 46. Thus, flexible support structure 70 may resist motion of plies 32 relative to one another within transition region 46 during deformation of charge 40. Additionally or alternatively, flexible support structure 70 also may resist relative motion of edges 34 within transition region 46. This may permit deformation of charge 40 to conformed charge 41 without, or without significant, motion of edges 34 relative to one another, thereby preserving a desired conformation for exposed surface 47 subsequent to the deformation.

Flexible vacuum chuck 200 may be configured to selectively apply a vacuum to interface 76 between charge 40 and flexible support structure 70 to selectively and operatively affix charge 40 to flexible support structure 70 and/or to define charge-support assembly 90. As an illustrative, non-exclusive example, flexible vacuum chuck 200 may apply the vacuum through flexible support structure 70. As a more specific but still illustrative, non-exclusive example, flexible support structure 70 may define one or more vacuum conduits 78 (as illustrated in FIG. 4), and flexible vacuum chuck 200 may apply the vacuum to interface 76 via vacuum conduits 78. As another illustrative, non-exclusive example, flexible support structure 70 may define a vacuum distribution surface 80 that is configured to distribute the vacuum at interface 76. Illustrative, non-exclusive examples of vacuum distribution surface 80 include any suitable roughened surface, undulating surface, porous surface, and/or surface that defines one or more fluid flow channels that extend along and/or parallel to interface 76.

It is within the scope of the present disclosure that flexible vacuum chuck 200 and flexible support structure 70 may be separate and/or distinct structures that may be operatively and/or separably affixed to one another, such as via application of the vacuum applied by flexible vacuum chuck 200. Under these conditions, flexible support structure 70 may define a chuck-mating surface 82 (as illustrated in FIG. 4) that may be configured to receive and/or contact flexible vacuum chuck 200. Chuck-mating surface 82, when present, may be (at least substantially) opposed to support surface 72 and/or may be a planar, or at least substantially planar, chuck-mating surface 82. Alternatively, it is also within the scope of the present disclosure that flexible vacuum chuck 200 may include and/or may define flexible support structure 70.

Flexible support structure 70 may include and/or be formed from any suitable material. As illustrative, non-exclusive examples, flexible support structure 70 may include a polymeric material, a flexible material, a polycarbonate, an elastomeric material, silicone, a resin material, a metal, aluminum, a material that is compatible with (and/or suitable for contact with) charge 40, and/or a heat-resistant material. As another illustrative, non-exclusive example, a material of construction of flexible support structure 70 may be based upon the nature and/or material properties of charge 40, as discussed in more detail herein.

As illustrated in dashed lines in FIGS. 4-6 and discussed in more detail herein, flexible vacuum chuck 200 may include, may be operatively affixed to, and/or may be supported by one or more selective stiffening elements 210. Selective stiffening elements 210 may be configured to define an engaged conformation and a disengaged conformation. When selective stiffening elements 210 are present, engaged with flexible vacuum chuck 200, and/or in the engaged conformation, flexible vacuum chuck 200 (and/or a charge-support assembly 90 that includes flexible vacuum chuck 200) may be configured to resist deformation in one or more directions. In contrast, and when selective stiffening elements 210 are not present, are not engaged with flexible vacuum chuck 200 and/or are in the disengaged conformation, flexible vacuum chuck 200 (and/or charge-support assembly 90 that includes flexible vacuum chuck 200) may be configured to permit deformation in the one or more directions.

In the illustrative, non-exclusive examples of FIGS. 4-6, selective stiffening element 210 is in the engaged conformation. This may permit separation of charge-support assembly 90 from layup surface 60 and/or transport of charge-support assembly 90 to cure surface 102 of layup mandrel 100 without deformation of charge-support assembly 90, without significant deformation of charge-support assembly 90, and/or without wrinkling of charge 40 during the separation and/or transport. Subsequently and as illustrated in FIG. 7, selective stiffening element 210 may be transitioned to the disengaged conformation (or removed from flexible vacuum chuck 200) to permit deformation of charge-support assembly 90 and conformation of charge 40 to the non-planar cure surface contour of cure surface 102, thereby permitting formation of conformed charge 41.

It is within the scope of the present disclosure that selective stiffening element 210 may be transitioned between the engaged conformation and the disengaged conformation in any suitable manner. As an illustrative, non-exclusive example, and when in the engaged conformation, selective stiffening element 210 may be operatively affixed to flexible vacuum chuck 200, such as via a vacuum (or a vacuum force). As another illustrative, non-exclusive example, and when in the disengaged conformation, selective stiffening element 210 may be operatively detached from flexible vacuum chuck 200 and/or may be separated from flexible vacuum chuck 200.

As illustrated in FIG. 3, system 20 may include and/or utilize a base material 50 that may extend (partially and/or completely) between charge 40 and layup surface 60. Base material 50 may include any suitable material and/or structure that may be located on layup surface 60 prior to charge 40 and/or that may be located between charge 40 and layup surface 60. As an illustrative, non-exclusive example, base material 50 may include and/or be a gas-permeable material that is configured to permit a gas (such as air) to penetrate between charge 40 and layup surface 60. As another illustrative, non-exclusive example, base material 50 may include and/or be a barrier material that is configured to resist contact between charge 40 and layup surface 60. As yet another illustrative, non-exclusive example, base material 50 also may include and/or be a release material that is configured to decrease and/or prevent adhesion between charge 40 and layup surface 60. As another illustrative, non-exclusive example, base material 50 may include and/or be a film, a sheet, and/or a coating.

As illustrated in FIG. 5, system 20 and/or charge-support assembly 90 thereof further may include and/or utilize an intermediate material 92 that may extend (partially or completely) between flexible support structure 70 and charge of composite material 40. Intermediate material 92 may include any suitable material and/or structure that may be operatively located on exposed surface 47, may be operatively located on support surface 72, and/or may be operatively located between charge 40 and flexible support structure 70. As an illustrative, non-exclusive example, intermediate material 92 may include and/or be a vacuum distribution material that is configured to distribute the vacuum across interface 76. As another illustrative, non-exclusive example, intermediate material 92 may include and/or be a barrier material that is configured to resist contact between charge 40 and flexible support structure 70. As yet another illustrative, non-exclusive example, intermediate material 92 may include and/or be a release material that is configured to decrease and/or prevent adhesion between charge 40 and flexible support structure 70. As another illustrative, non-exclusive example, intermediate material 92 may include and/or be a film, a sheet, and/or a coating.

It is within the scope of the present disclosure that flexible support structure 70 and/or flexible vacuum chuck 200 may be adapted, configured, designed, and/or constructed to be re-used. As an illustrative, non-exclusive example, flexible support structure 70 may be utilized to locate a plurality of charges 40 on cure surface 102 of FIGS. 6-8 and also may be referred to herein as a reusable flexible support structure 70. As another illustrative, non-exclusive example, flexible vacuum chuck 200 may be utilized, in conjunction with flexible support structure 70, to locate the plurality of charges 40 on cure surface 102 and also may be referred to herein as a reusable flexible vacuum chuck 200.

Figure 9:
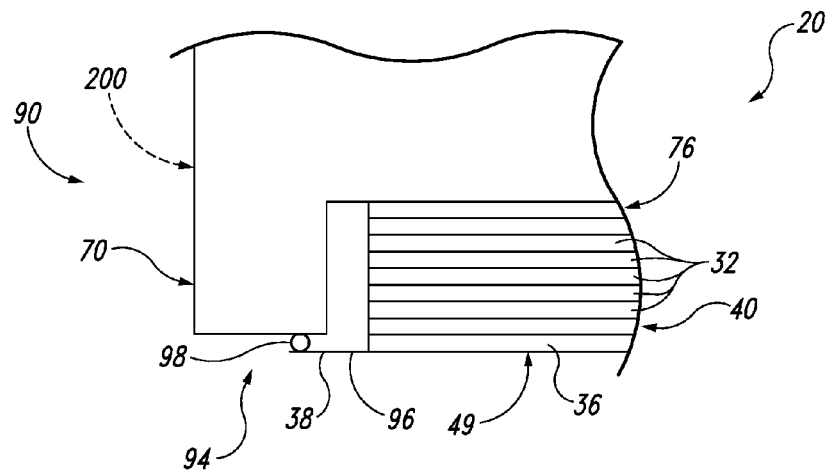
FIG. 9 is a schematic cross-sectional view of a portion of a charge-support assembly according to the present disclosure.

FIG. 9 is a schematic cross-sectional view of a portion of a charge-support assembly 90 according to the present disclosure. FIG. 9 illustrates that charge-support assembly 90 may include and/or be utilized with a seal 94 that may extend between interfacial surface 49 of charge 40 and flexible support structure 70 and/or flexible vacuum chuck 200. Seal 94 may be adapted, configured, sized, designed, and/or constructed to form a fluid seal that permits evacuation of interface 76 between charge 40 and flexible support structure 70. This fluid seal may (at least partially) fluidly isolate interface 76 from an ambient environment that surrounds charge-support assembly 90 and/or may permit charge 40 to be operatively affixed to flexible support structure 70 via application of the vacuum to form charge-support assembly 90.

Seal 94 may be formed in any suitable manner. As an illustrative, non-exclusive example, a first ply 36 of the plurality of plies 32 may define an outer perimeter that extends past a remainder of plies 32 to define an extension region 38. Extension region 38 may extend between charge 40 and flexible support structure 70 and/or flexible vacuum chuck 200 to define at least a portion of seal 94. As another illustrative, non-exclusive example, a skirt material 96 may be attached to an outer perimeter of first ply 36, and this skirt material 96 may extend between first ply 36 and flexible support structure 70 and/or flexible vacuum chuck 200 to define at least a portion of seal 94. As yet another illustrative, non-exclusive example, an adhesive material 98 may form a portion of seal 94, may affix extension region 38 to flexible support structure 70, may affix extension region 38 to flexible chuck 200, may affix skirt material 96 to flexible support structure 70, and/or may affix skirt material 96 to flexible chuck 200.

Figure 10:
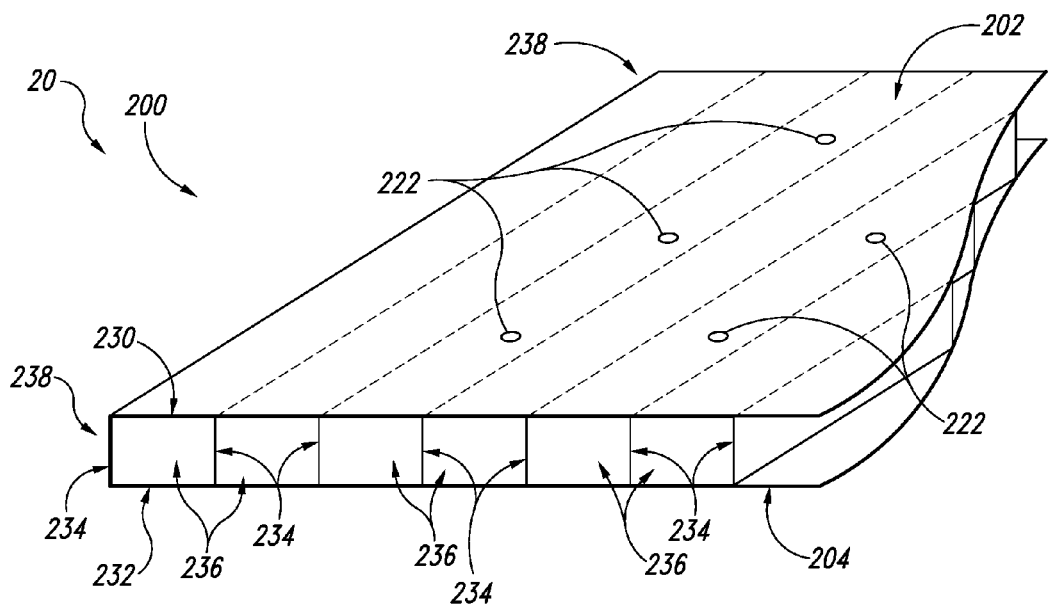
FIG. 10 is a schematic representation of illustrative, non-exclusive examples of a flexible vacuum chuck.
Figure 11:
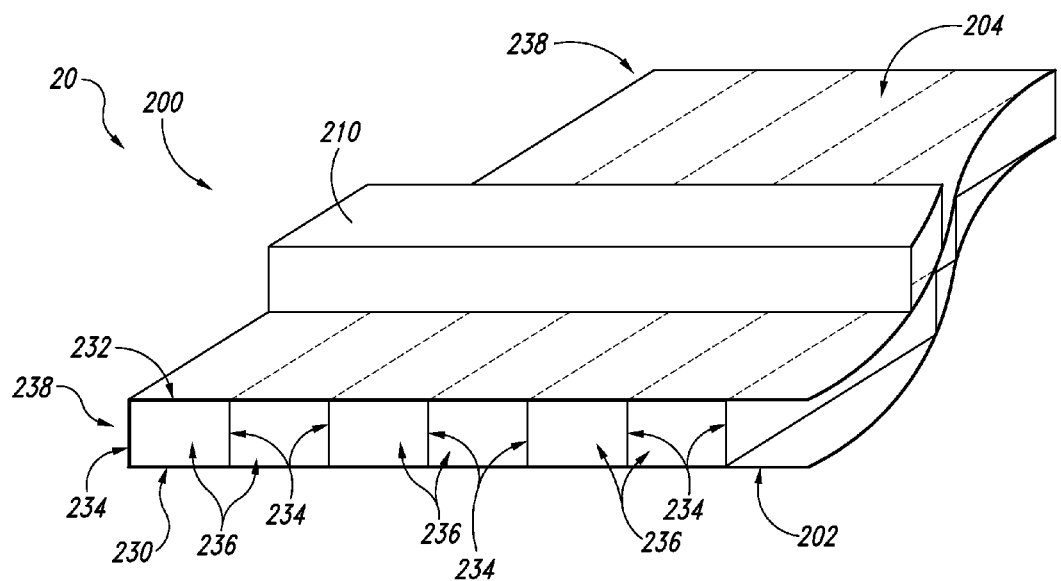
FIG. 11 is another schematic representation of illustrative, non-exclusive examples of a flexible vacuum chuck.
Figure 12:
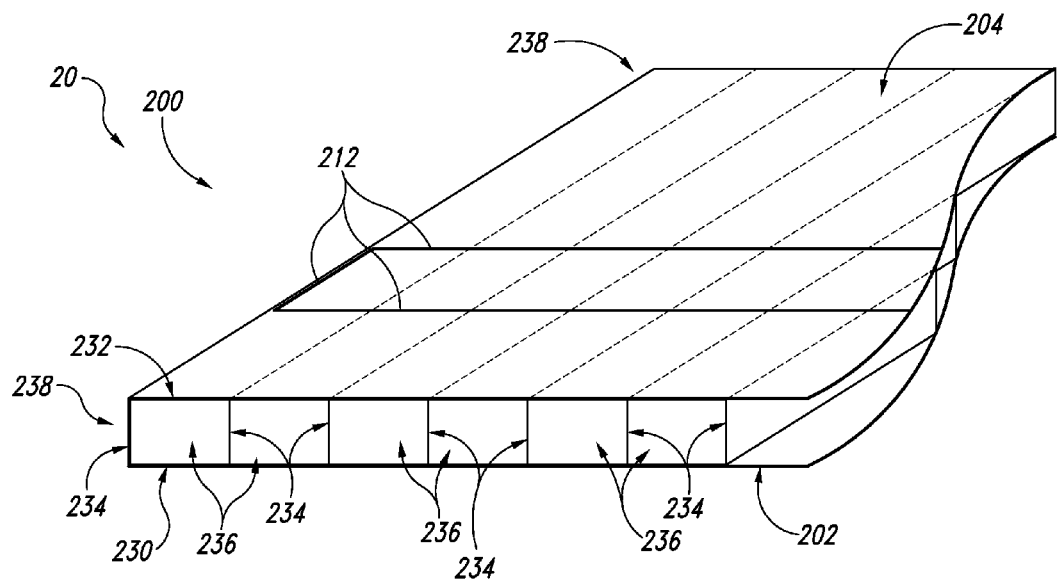
FIG. 12 is another schematic representation of illustrative, non-exclusive examples of a flexible vacuum chuck.

FIGS. 10-12 are less schematic but still illustrative, non-exclusive examples of a flexible vacuum chuck 200 that may be utilized with and/or included in the systems and methods according to the present disclosure. It is within the scope of the present disclosure that flexible vacuum chuck 200 of FIGS. 10-12 may be utilized with any of the systems 20 that are disclosed herein with reference to any of FIGS. 3-9.

Flexible vacuum chuck 200 includes a first planar wall 230, a second, opposed planar wall 232, and a plurality of elongate webs 234 that extend between first planar wall 230 and second planar wall 232. Planar walls 230 and 232, together with the plurality of elongate webs 234, define a plurality of elongate channels 236 that extend within flexible vacuum chuck 200 and may function as vacuum manifolds. As illustrated in FIG. 10, elongate channels 236 may be in fluid communication with a plurality of air holes 222, which may provide fluid communication between elongate channels 236 and interface 76 when flexible vacuum chuck 200 applies the vacuum to interface 76 to operatively affix charge 40 to flexible support structure 70 and form charge-support assembly 90 (as illustrated in FIGS. 4-7).

It is within the scope of the present disclosure that channels 236 may extend along a longitudinal axis that is parallel to first planar wall 230 and/or second planar wall 232, may extend from an edge 238 of flexible vacuum chuck 200, may extend from a first edge of flexible vacuum chuck 200 to a second edge of flexible vacuum chuck 200, and/or may extend between two opposed edges of flexible vacuum chuck 200.

FIG. 10 illustrates flexible vacuum chuck 200 with a first side 202, which is defined by first planar wall 230 and includes air holes 222, facing in an upward direction. First side 202 may be configured to contact flexible support structure 70, as illustrated in FIGS. 4-7. In contrast, FIGS. 11-12 illustrate flexible vacuum chuck 200 with a second side 204, which is defined by second planar wall 232, facing in the upward direction. As illustrated in FIG. 11, selective stiffening elements 210, when present, may be operatively engaged with second side 204 when selective stiffening elements 210 are in the engaged state, such as via a vacuum that may be applied between selective stiffening elements 210 and second side 204. Selective stiffening elements 210 may increase a rigidity of flexible vacuum chuck 200 and/or resist deformation of flexible vacuum chuck 200, at least in a direction that is parallel to a longitudinal axis of selective stiffening elements 210.

As illustrated in FIG. 12, selective stiffening elements 210 may be operatively disengaged (or removed) from second side 204 (or placed in the disengaged state) to permit deformation of flexible vacuum chuck 200. As further illustrated in FIG. 12, second side 204 (or, additionally or alternatively, selective stiffening elements 210) may include a sealing material 212, which may be selected and/or configured to form a fluid seal between second side 204 and selective stiffening elements 210 when the selective stiffening elements are in the engaged state.

Figure 13:
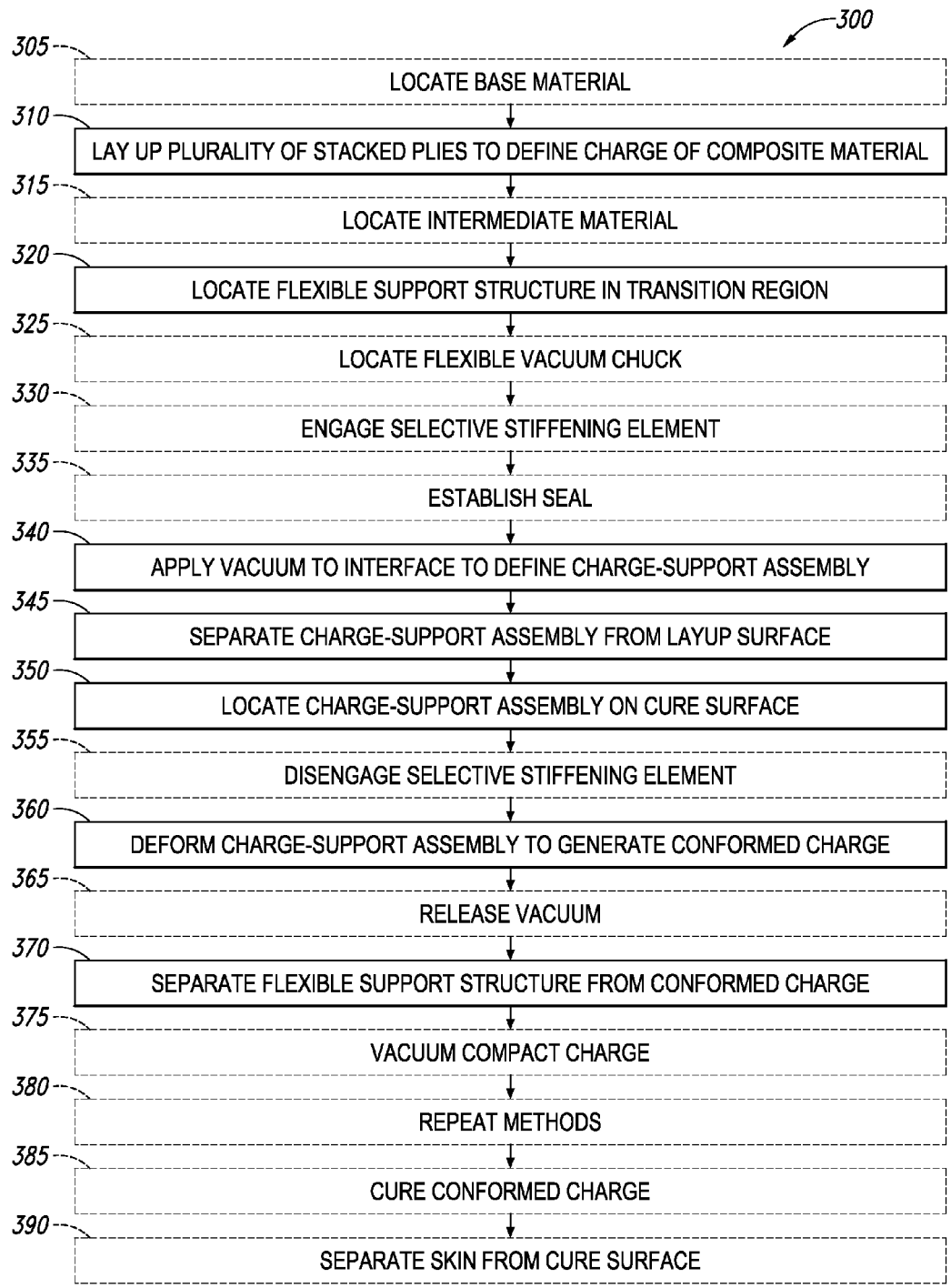
FIG. 13 is a flowchart depicting methods according to the present disclosure.

FIG. 13 schematically provides a flowchart that represents illustrative, non-exclusive examples of methods 300 according to the present disclosure. In FIG. 13, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 13 are not limiting and other methods and steps are within the scope of the present disclosure, including methods having greater than or fewer than the number of steps illustrated, as understood from the discussions herein.

Methods 300 may include locating a base material at 305 and include laying up a plurality of plies of composite material on a layup surface to generate a plurality of stacked plies that defines a charge of composite material at 310. Methods 300 further may include locating an intermediate material at 315 and include locating a flexible support structure in a transition region of the charge of composite material at 320. Methods 300 also may include locating a flexible vacuum chuck at 325, engaging a selective stiffening element at 330, and/or establishing a seal at 335. Methods 300 include applying a vacuum to an interface between the charge and the flexible support structure to define a charge-support assembly at 340, separating the charge-support assembly from the support surface at 345, and locating the charge-support assembly on a cure surface at 350. Methods 300 also may include disengaging the selective stiffening element at 355 and include deforming the charge-support assembly to generate a conformed charge of composite material at 360, releasing the vacuum at 365, and separating the flexible support structure from the conformed charge of composite material at 370. Methods 300 further may include vacuum compacting the charge of composite material at 375, repeating the methods at 380, curing the conformed charge of composite material at 385, and/or separating a skin of a composite structure that is defined by the conformed charge of composite material from a cure surface at 390.

Locating the base material at 305 may include locating the base material between the charge of composite material and the layup surface and may be accomplished in any suitable manner. As an illustrative, non-exclusive example, the locating at 305 may include placing the base material on the layup surface prior to the laying up at 310. Illustrative, non-exclusive examples of the base material are disclosed herein.

Laying up the plurality of plies of composite material on a layup surface to generate the plurality of stacked plies that defines the charge of composite material at 310 may include laying up to define a first region of the charge of composite material that has a first number of stacked plies and a first thickness and also laying up to define a second region of the charge of composite material that has a second number of stacked plies and a second thickness that is greater than the first thickness. Illustrative, non-exclusive examples of the first number of stacked plies, a ratio of the second number of stacked plies to the first number of stacked plies, the first thickness, a ratio of the second thickness to the first thickness, and a maximum dimension of the charge of composite material that may be defined by the laying up at 310 are disclosed herein.

The first region and the second region may define a transition region therebetween, and the transition region may be defined on an exposed surface of the charge of composite material. It is within the scope of the present disclosure that the laying up at 310 may include laying up such that the charge of composite material includes a first plurality of plies of composite material that extends within both the first region and the second region, as well as a second plurality of plies of composite material that extends within the second region but not within the first region. Under these conditions, the second plurality of plies of composite material may include a plurality of edges, and these edges may define the transition region.

Locating the intermediate material at 315 may include locating the intermediate material between the flexible support structure and the charge of composite material and may be accomplished in any suitable manner. As an illustrative, non-exclusive example, the locating at 315 may include placing the intermediate material on the charge of composite material prior to the locating at 320. Illustrative, non-exclusive examples of the intermediate material are disclosed herein.

Locating the flexible support structure in the transition region of the charge of composite material at 320 may include locating the flexible support structure such that it extends within, covers, and/or contacts the transition region. Additionally or alternatively, the locating at 320 also may include locating such that the charge of composite material extends between the flexible support structure and the layup surface.

It is within the scope of the present disclosure that the locating at 320 may include at least substantially covering the charge of composite material with the flexible support structure. Additionally or alternatively, the locating at 320 also may include enclosing the charge of composite material in a volume that is defined by the flexible support structure and the layup surface. As discussed in more detail herein, the flexible support structure may include a support surface that defines a support surface profile that corresponds to the exposed surface profile of the charge of composite material, and the locating at 320 may include locating such that the support surface of the flexible support structure conforms to, contacts, conformally contacts, and/or encloses the exposed surface of the charge of composite material.

It is within the scope of the present disclosure that the flexible support structure may be formed prior to the locating at 320 and/or may be formed from a solid, at least substantially solid, elastic, and/or viscoelastic material that is preformed prior to the locating at 320. However, it is also within the scope of the present disclosure that the flexible support structure may be formed concurrently with the locating at 320. As an illustrative, non-exclusive example, the locating at 320 may include applying a support structure liquid to the exposed surface of the charge of composite material and curing the support structure liquid to form, or define, the flexible support structure. Subsequent to the curing, the flexible support structure may be a solid, at least substantially solid, elastic, and/or viscoelastic flexible support structure.

Locating the flexible vacuum chuck at 325 may include locating the flexible vacuum chuck such that the flexible support structure extends between the flexible vacuum chuck and the charge of composite material. It is within the scope of the present disclosure that the flexible vacuum chuck may be separate and/or distinct from the flexible support structure. Under these conditions, the locating at 325 may include contacting the flexible vacuum chuck with the flexible support structure and/or with a chuck-mating surface thereof. Alternatively, it is also within the scope of the present disclosure that the flexible support structure may be defined by, or form a part of, the flexible vacuum chuck. Under these conditions, the locating at 320 may be performed concurrently with and/or may include the locating at 325. Regardless, the applying at 340 may include applying the vacuum with the flexible vacuum chuck. Additionally or alternatively, the deforming at 360 may include deforming the flexible vacuum chuck concurrently with the deforming the charge-support assembly.

Engaging the selective stiffening element at 330 may include engaging any suitable selective stiffening element in any suitable manner. As an illustrative, non-exclusive example, and as discussed, the selective stiffening element may be configured to resist deformation of the charge-support assembly when in an engaged conformation and to permit deformation of the charge-support assembly when in a disengaged conformation. Under these conditions, the engaging at 330 may include engaging the selective stiffening element (or transitioning the selective stiffening element to the engaged state) to resist deformation of the charge-support assembly prior to and/or during the locating at 350.

When methods 300 include the engaging at 330, methods 300 further may include disengaging the selective stiffening element at 355. This may include disengaging prior to the deforming at 360 and/or disengaging to permit the deforming at 360.

Establishing the seal at 335 may include may include establishing any suitable seal, or fluid seal, between the charge of composite material and the flexible support structure and/or between the charge of composite material and the flexible vacuum chuck. This may include establishing the fluid seal prior to the applying at 340, establishing the fluid seal to permit the applying at 340, and/or establishing the fluid seal to permit formation of the charge-support assembly as a result of the applying at 340.

It is within the scope of the present disclosure that the establishing at 335 may be accomplished in any suitable manner. As an illustrative, non-exclusive example, the laying up at 310 may include laying up a first ply of composite material that defines an outer perimeter that extends past a remainder of the plurality of plies of composite material to define an extension region. This extension region may extend between the remainder of the plurality of plies of composite material and the flexible support structure and/or the flexible vacuum chuck and may define at least a portion of the seal. As another illustrative, non-exclusive example, the establishing at 335 may include adhering the extension region to the flexible support structure and/or to the flexible vacuum chuck.

As yet another illustrative, non-exclusive example, and prior to the laying up at 310, the establishing at 335 may include attaching a skirt material to the outer perimeter of the first ply of composite material. This skirt material may extend between the plurality of plies of composite material and the flexible support structure and/or the flexible vacuum chuck and may define at least a portion of the seal. As another illustrative, non-exclusive example, the establishing at 335 also may include adhering the skirt material to the flexible support structure and/or to the flexible vacuum chuck.

Applying the vacuum to the interface between the charge and the flexible support structure to define the charge-support assembly at 340 may include applying the vacuum to temporarily affix the charge to the flexible support structure and to define the charge-support assembly. This may include applying the vacuum only to the interface, applying the vacuum to the interface and to a portion of the plurality of plies of composite material that defines the charge, and/or applying the vacuum to the interface and to the entire charge.

It is within the scope of the present disclosure that that applying at 340 may be accomplished in any suitable manner. As an illustrative, non-exclusive example, the applying at 340 may include applying the vacuum through the flexible support structure to the interface, such as via a plurality of vacuum conduits that is defined by, or within, the flexible support structure. As another illustrative, non-exclusive example, the flexible support structure may define a vacuum distribution surface that is configured to distribute the vacuum at the interface, and the applying at 340 may include applying to, or via, the vacuum distribution surface.

The applying at 340 may include temporarily and operatively affixing the charge of composite material to the flexible support surface, such as to define the charge-support assembly. It is within the scope of the present disclosure that methods 300 further may include maintaining the applying at 340, thereby maintaining the charge of composite material and the flexible support surface operatively affixed to one another, during the separating at 345, during the locating at 350, and/or during the deforming at 360.

Separating the charge-support assembly from the support surface at 345 may include separating in any suitable manner. As an illustrative, non-exclusive example, the applying at 340 may generate a vacuum force between the charge of composite material and the flexible support structure. This vacuum force may be greater than an attractive force (such as an adhesive force) between the charge of composite material and the layup surface, and the separating at 345 may include moving the flexible support structure and the layup surface away from one another to accomplish the separating at 345.

Locating the charge-support assembly on the cure surface at 350 may include locating the charge-support assembly on any suitable cure surface that may define a non-planar cure surface contour. As an illustrative, non-exclusive example, the locating at 350 may include translating the charge-support assembly to the cure surface and/or translating the cure surface to the charge-support assembly. As another illustrative, non-exclusive example, the locating at 350 may include contacting the charge of composite material with the cure surface. As yet another illustrative, non-exclusive example, the locating at 350 may include operatively supporting the charge-support assembly with the cure surface. As another illustrative, non-exclusive example, the locating at 350 may include locating such that the charge of composite material extends between the cure surface and the flexible support structure. As yet another illustrative, non-exclusive example, the locating at 350 also may include locating such that the charge of composite material is placed in tension during the deforming at 360. As another illustrative, non-exclusive example, the locating at 350 may include locating such that the charge of composite material is on a convex side of the charge-support assembly during the deforming at 360.

Deforming the charge-support assembly to generate the conformed charge of composite material at 360 may include conforming the charge of composite material to the non-planar cure surface contour of the cure surface. This may include bending the charge-support assembly, straining the charge-support assembly, placing at least a portion of the charge-support assembly (such as the charge of composite material) in tension, and/or changing a shape of the charge-support assembly to generate the conformed charge of composite material. The conformed charge of composite material may define the desired non-planar skin surface contour for the skin of the composite structure. It is within the scope of the present disclosure that the deforming at 360 may include deforming, or concurrently deforming, both the charge of composite material and the flexible support structure.

The deforming at 360 may include deforming the charge-support assembly in at least a first dimension and also may include deforming the charge-support assembly in a second dimension that may be at least substantially perpendicular to the first dimension, such as to generate a non-planar skin surface contour that defines a complex surface contour that varies in two dimensions. It is within the scope of the present disclosure that the deforming at 360 may be accomplished in any suitable manner. As an illustrative, non-exclusive example, the deforming at 360 may include applying a deformation force to the charge-support assembly. Illustrative, non-exclusive examples of the deformation force include any suitable gravitational force, compressive force, pneumatic force, hydraulic force, and/or mechanical force. The deformation force may be applied for any suitable deformation time. Illustrative, non-exclusive examples of the deformation time include deformation times of at least 1 minute, at least 5 minutes, at least 10 minutes, at least 15 minutes, at least 30 minutes, at least 45 minutes, or at least 60 minutes. Similarly, the deformation force may be provided such that the charge of composite material deforms at any suitable deformation rate.

As another illustrative, non-exclusive example, the deforming at 360 also may include heating the charge-support assembly to facilitate conforming the charge-support assembly to the non-planar cure surface contour of the cure surface. The heating the charge-support assembly may include heating the charge of composite material and/or heating the flexible support structure and may be performed at any suitable time and/or with any suitable sequence within methods 300. As an illustrative, non-exclusive example, the heating the charge-support assembly may include heating prior to the deforming at 360, such as to prepare the charge-support assembly for the deforming at 360. As another illustrative, non-exclusive example, the heating the charge-support assembly also may include heating during at least a portion, or even all, of the deforming at 360. As yet another illustrative, non-exclusive example, the heating the charge-support assembly may include heating subsequent to the deforming at 360, such as to reduce and/or release residual stresses within the conformed charge of composite material. This may include heating prior to and/or separately from the curing at 385.

The deforming may include maintaining the charge of composite material in tension with the flexible support structure and/or resisting a relative motion among the plurality of stacked plies. Maintaining the charge of composite material in tension may include maintaining in tension in a direction that is parallel to an interface between a first stacked ply of the plurality of stacked plies and a second stacked ply of the plurality of stacked plies. This may include maintaining the charge of composite material completely, or fully, in tension, maintaining the charge of composite material in tension across an entire thickness thereof, and/or maintaining at least a threshold fraction of a total volume of the charge of composite material in tension. Illustrative, non-exclusive examples of the threshold fraction of the total volume include at least 50%, at least 60%, at least 70%, at least 80%, at least 90%, at least 95%, at least 99%, or 100% of the total volume.

The maintaining may be accomplished in any suitable manner. As an illustrative, non-exclusive example, the maintaining may include locating the charge of composite material on the convex side of the charge-support assembly during the deforming. As another illustrative, non-exclusive example, the maintaining also may include locating the charge of composite material between the flexible support structure and the cure surface. As yet another illustrative, non-exclusive example, the maintaining may include resisting wrinkling of the charge of composite material during the deforming.

The maintaining may include selecting the flexible support structure to permit, facilitate, or produce the maintaining. This may include selecting the flexible support structure based, at least in part, on one or more of a thickness of the flexible support structure, a Young's modulus of the flexible support structure, a material composition of the flexible support structure, a thickness of the charge of composite material, a Young's modulus of the charge of composite material, a material composition of the charge of composite material, a maximum number plies in a plurality of stacked plies that defines the charge of composite material, an orientation of individual plies within the plurality of stacked plies that defines the charge of composite material, a viscoelasticity of the charge of composite material, and/or a maximum interfacial force that may be applied to the interface between the charge of composite material and the flexible support structure without relative motion therebetween.

Resisting the relative motion among the plurality of stacked plies may include resisting the relative motion in a direction that is parallel to the interface. As an illustrative, non-exclusive example, the resisting may include resisting a relative motion of the plurality of edges that are defined by the second plurality of plies that comprise a portion of the second region. As another illustrative, non-exclusive example, the resisting the relative motion may include pressing against and/or compressing the transition region with the flexible support structure during the deforming. As yet another illustrative, non-exclusive example, the resisting the relative motion also may include contacting the transition region with the flexible support structure during the deforming.

Releasing the vacuum at 365 may include releasing the vacuum to facilitate and/or permit the separating at 370. As an illustrative, non-exclusive example, the releasing at 365 may include exposing the interface between the charge of composite material and the flexible support structure to atmospheric pressure. As another illustrative, non-exclusive example, the releasing at 365 also may include pressurizing the interface to generate a pressure force that may facilitate, produce, and/or form a portion of the separating at 370.

Separating the flexible support structure from the conformed charge of composite material at 370 may include separating while retaining the conformed charge of composite material on the cure surface. As an illustrative, non-exclusive example, the separating at 370 may include translating the flexible support surface and the conformed charge of composite material away from one another. As another illustrative, non-exclusive example, the separating at 370 may include separating the flexible support structure from the conformed charge of composite material without separating the conformed charge of composite material from the cure surface of the layup mandrel. As yet another illustrative, non-exclusive example, the separating at 370 also may include pressurizing the interface to generate the pressure force, as discussed herein.

Vacuum compacting the charge of composite material at 375 may include vacuum compacting the charge of composite material, or any suitable portion thereof, at any suitable point within methods 300. As an illustrative, non-exclusive example, the vacuum compacting at 375 may include vacuum compacting the charge of composite material on the cure surface. This may include vacuum compacting to at least partially define the conformed charge of composite material and/or to at least partially produce the deforming at 360. The vacuum compacting at 375 may include vacuum compacting the charge of composite material between the flexible support structure and the cure surface, such as prior to the separating at 370. Additionally or alternatively, the vacuum compacting at 375 also may include vacuum compacting the conformed charge of composite material on the cure surface subsequent to the separating at 370, such as by vacuum bagging the conformed charge of composite material on the cure surface.

Repeating the methods at 380 may include repeating any suitable portion of methods 300. As an illustrative, non-exclusive example, the charge of composite material may be a first charge of composite material and the repeating at 380 may include repeating at least the laying up at 310, the locating at 320, the applying at 340, the separating at 345, the locating at 350, the deforming at 360 and the separating at 370 to form a plurality of conformed charges of composite material on the cure surface of the layup mandrel. As another illustrative, non-exclusive example, the conformed charge of composite material may correspond to a portion of the skin of the composite structure and the repeating at 380 may include repeating to define a larger portion, or even all, of the skin of the composite structure.

Under certain conditions, it may be desirable to decrease an amount of time that the plurality of conformed charges of composite material are located on the cure surface and/or in contact with the layup mandrel. This may decrease a number of layup mandrels that may be needed for a given, or desired, production rate of the composite structure and/or may permit formation of a greater number of composite structures with a given layup mandrel in a given time period. With this in mind, the repeating at 380 also may include repeating the laying up at 310, repeating the locating at 320, repeating the applying at 340, and repeating the separating at 345 a plurality of times to define a respective plurality of separate and/or distinct charge-support assemblies. The repeating at 380 then may include repeating the locating at 350, the deforming at 360, and the separating at 370 with each of the distinct charge-support assemblies (sequentially and/or in parallel), thereby decreasing an amount of time during which the plurality of conformed charges of composite material is located on the cure surface and/or in contact with the layup mandrel.

Curing the conformed charge of composite material at 385 may include curing the conformed charge of composite material to form the skin of the composite structure and may be accomplished in any suitable manner. As an illustrative, non-exclusive example, the curing at 385 may include heating the conformed charge of composite material, heating the conformed charge of composite material on the layup mandrel, and/or heating the conformed charge of composite material together with the layup mandrel. The curing at 385 may be performed with any suitable sequence within methods 300, such as subsequent to the separating at 370 and/or prior to the separating at 390.

Separating the skin of the composite structure that is defined by the conformed charge of composite material from the cure surface at 390 may include separating to permit operation and/or use of the skin and/or of the composite structure and may be performed in any suitable manner. As an illustrative, non-exclusive example, the separating at 390 may include moving the skin and the layup mandrel away from one another.

The systems and methods disclosed herein may permit formation of the skin of the composite structure without vacuum bagging the charge of composite material and/or may decrease a frequency of vacuum bagging of the charge of composite material. As an illustrative, non-exclusive example, methods 300 may include performing the locating at 320, the applying at 340, the separating at 345, the locating at 350, and/or the deforming at 360 without vacuum bagging the charge of composite material. Additionally or alternatively, the vacuum chuck may be utilized to vacuum compact the charge of composite material on the cure surface of the layup mandrel without vacuum bagging the charge of composite material.

Figure 14:
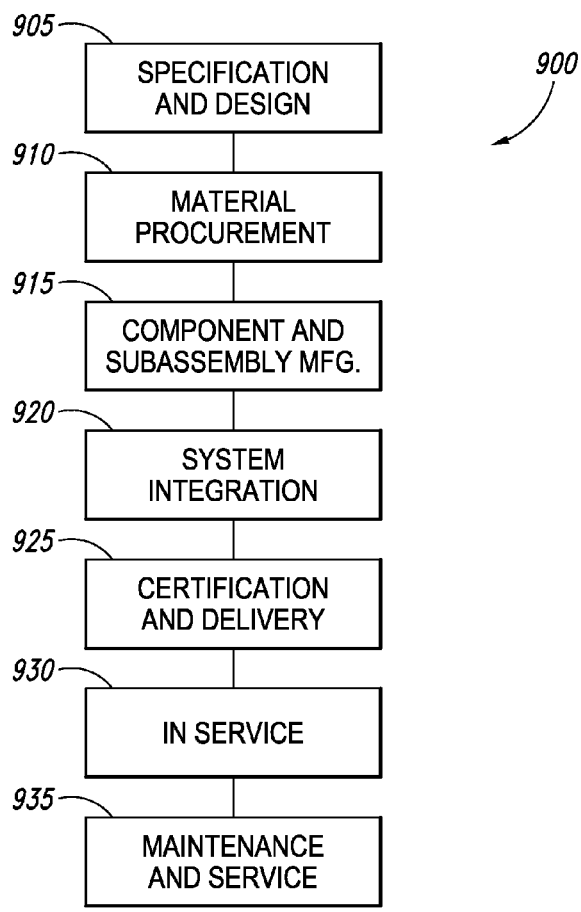
FIG. 14 is a flow diagram of aircraft production and service methodology.
Figure 15:
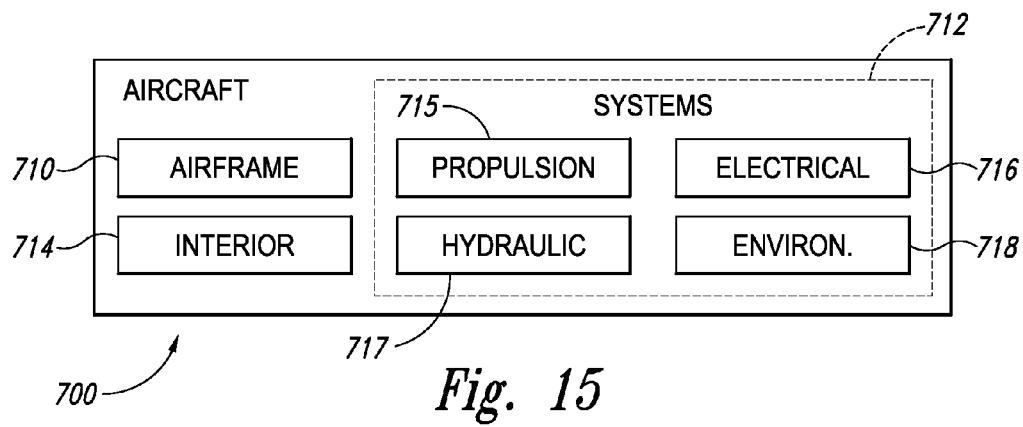
FIG. 15 is a block diagram of an aircraft.

Referring now to FIGS. 14-15, embodiments of the disclosure may be described in the context of an aircraft manufacturing and service method 900, as shown in FIG. 14, and an aircraft 700, as shown in FIG. 15. During pre-production, exemplary method 900 may include specification and design 905 of the aircraft 700 and material procurement 910. During production, component and subassembly manufacturing 915 and system integration 920 of the aircraft 700 take place. Thereafter, the aircraft 700 may go through certification and delivery 925 in order to be placed in service 930. While in service by a customer, the aircraft 700 is scheduled for routine maintenance and service 935 (which also may include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, the aircraft 700 produced by exemplary method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems may be included. Although an aerospace example is shown, the principles of the invention may be applied to other industries, such as the automotive industry.

System and methods embodied herein may be employed during any one or more of the stages of the manufacturing and service method 900. For example, components or subassemblies corresponding to component and subassembly manufacturing process 915 may be fabricated or manufactured in a manner similar to components or subassemblies produced while the aircraft 700 is in service. Also, one or more system embodiments, method embodiments, or a combination thereof may be utilized during the production stages 915 and 920, for example, by substantially expediting assembly of or reducing the cost of an aircraft 700. Similarly, one or more of system embodiments, method embodiments, or a combination thereof may be utilized while the aircraft 700 is in service, for example and without limitation, to maintenance and service 935.

Illustrative, non-exclusive examples of inventive subject matter according to the present disclosure are described in the following enumerated paragraphs:

A1. A method of forming a non-planar skin surface contour of a skin for a composite structure, the method comprising:

optionally laying up a plurality of plies of composite material on a layup surface to generate a plurality of stacked plies that defines a charge of composite material, wherein the laying up comprises:

defining a first region of the charge of composite material that has a first number of stacked plies and a first thickness; and defining a second region of the charge of composite material that has a second number of stacked plies and a second thickness that is greater than the first thickness;

wherein the first region and the second region define a transition region therebetween;

locating a flexible support structure in the transition region such that the charge of composite material extends between the flexible support structure and the layup surface;

applying a vacuum to an interface between the charge of composite material and the flexible support structure to temporarily define a charge-support assembly;

during the applying, separating the charge-support assembly from the layup surface;

locating the charge-support assembly on a cure surface of a layup mandrel, wherein the cure surface defines a non-planar cure surface contour;

deforming the charge-support assembly to conform the charge of composite material to the non-planar cure surface contour and generate a conformed charge of composite material that defines the non-planar skin surface contour, optionally wherein the deforming includes:

maintaining, with the flexible support structure, the charge of composite material in tension in a direction that is parallel to an interface between a first stacked ply of the plurality of stacked plies and a second stacked ply of the plurality of stacked plies; and resisting, with the flexible support structure, a relative motion among the plurality of stacked plies in the direction that is parallel to the interface;

releasing the vacuum; and separating the flexible support structure from the conformed charge of composite material while retaining the conformed charge of composite material on the cure surface.

A2. The method of paragraph A1, wherein the method further includes locating a flexible vacuum chuck such that the flexible support structure extends between the flexible vacuum chuck and the charge of composite material.

A2.1 The method of paragraph A2, wherein the locating the flexible vacuum chuck includes contacting the flexible vacuum chuck with the flexible support structure.

A2.2 The method of any of paragraphs A2-A2.1, wherein, subsequent to the locating the flexible support structure and prior to the separating the charge-support assembly from the layup surface, the flexible support structure defines an at least substantially planar chuck-mating surface that is configured to receive the flexible vacuum chuck, and further wherein the locating the flexible vacuum chuck includes locating the flexible vacuum chuck on the chuck-mating surface.

A3. The method of paragraph A1, wherein the flexible support structure is defined by a flexible vacuum chuck, and further wherein the locating the flexible support structure includes locating the flexible vacuum chuck.

A4. The method of any of paragraphs A2-A3, wherein the applying the vacuum includes applying the vacuum with the flexible vacuum chuck.

A5. The method of any of paragraphs A2-A4, wherein the flexible vacuum chuck includes a selective stiffening element, wherein the method includes engaging the selective stiffening element to resist deformation of the charge-support assembly prior to the locating, and further wherein the method includes disengaging the selective stiffening element to permit the deforming.

A6. The method of any of paragraphs A2-A5, wherein the deforming includes deforming the flexible vacuum chuck concurrently with deforming the charge-support assembly.

A7. The method of any of paragraphs A1-A6, wherein the layup surface is a substantially planar layup surface, and optionally wherein the laying up the plurality of plies of composite material includes laying up on the substantially planar layup surface.

A8. The method of any of paragraphs A1-A7, wherein the laying up includes laying up such that the first number of stacked plies includes at least 5, at least 10, at least 15, at least 20, at least 25, at least 30, at least 35, at least 40, at least 45, or at least 50 stacked plies.

A9. The method of any of paragraphs A1-A8, wherein the laying up includes laying up such that the second number of stacked plies is at least 1.1 times, at least 1.25 times, at least 1.5 times, at least 1.75 times, at least 2 times, at least 2.5 times, at least 3 times, at least 3.5 times, at least 4 times, or at least 5 times the first number of stacked plies.

A10. The method of any of paragraphs A1-A9, wherein the laying up includes laying up such that the first thickness is at least 1 mm, at least 2 mm, at least 3 mm, at least 4 mm, at least 5 mm, at least 7.5 mm, at least 10 mm, at least 15 mm, or at least 20 mm.

A11. The method of any of paragraphs A1-A10, wherein the laying up includes laying up such that the second thickness is at least 1.1 times, at least 1.25 times, at least 1.5 times, at least 1.75 times, at least 2 times, at least 2.5 times, at least 3 times, at least 3.5 times, at least 4 times, or at least 5 times the first thickness.

A12. The method of any of paragraphs A1-A11, wherein the charge of composite material defines a maximum dimension, and further wherein the laying up includes laying up such that the maximum dimension is at least 5 meters, at least 10 meters, at least 15 meters, at least 20 meters, at least 25 meters, at least 30 meters, at least 35 meters, at least 40 meters, at least 45 meters, or at least 50 meters.

A13. The method of any of paragraphs A1-A12, wherein the laying up includes laying up such that the charge of composite material includes a first plurality of plies of composite material that extends within both the first region and the second region and a second plurality of plies of composite material that extends within the second region but not within the first region.

A13.1 The method of paragraph A13, wherein the second plurality of plies of composite material includes a plurality of edges that defines the transition region.

A13.1.1 The method of paragraph A13.1, wherein the resisting the relative motion includes resisting motion of the plurality of edges relative to one another.

A14. The method of any of paragraphs A1-A13.1.1, wherein the locating the flexible support structure includes at least substantially covering the charge of composite material with the flexible support structure.

A15. The method of any of paragraphs A1-A14, wherein the locating the flexible support structure includes enclosing the charge of composite material within a volume that is defined by the flexible support structure and the layup surface.

A16. The method of any of paragraphs A1-A15, wherein the flexible support structure includes a support surface that defines a support surface profile, wherein, subsequent to the laying up and prior to the locating the flexible support structure, the charge of composite material defines an exposed surface that defines a non-planar exposed surface profile, wherein the support surface profile corresponds to the non-planar exposed surface profile, and further wherein the locating the flexible support structure includes locating such that the support surface conforms to the exposed surface.

A17. The method of any of paragraphs A1-A16, wherein the flexible support structure is formed prior to the locating.

A18. The method of any of paragraphs A1-A17, wherein the locating the flexible support structure includes applying a support structure liquid to an/the exposed surface of the charge of composite material and curing the support structure liquid to form the flexible support structure.

A19. The method of any of paragraphs A1-A18, wherein the deforming the charge-support assembly includes deforming the charge of composite material and deforming the flexible support structure.

A20. The method of any of paragraphs A1-A19, wherein the deforming the charge-support assembly includes deforming the charge-support assembly in a first dimension and in a second dimension that is perpendicular to the first dimension.

A21. The method of any of paragraphs A1-A20, wherein the method further includes heating the charge-support assembly at least one of (i) prior to the deforming, (ii) during the deforming, and (iii) subsequent to the deforming.

A22. The method of any of paragraphs A1-A21, wherein the deforming includes applying a deformation force to the charge-support assembly to facilitate the deforming.

A22.1 The method of paragraph A22, wherein the deformation force includes at least one of a gravitational force, a compressive force, a pneumatic force, a hydraulic force, and a mechanical force.

A23. The method of any of paragraphs A1-A22.1, wherein the maintaining includes locating the charge of composite material on a convex side of the charge-support assembly during the deforming.

A24. The method of any of paragraphs A1-A23, wherein the maintaining includes locating the charge of composite material between the flexible support structure and the cure surface.

A25. The method of any of paragraphs A1-A24, wherein the maintaining includes resisting wrinkling of the charge of composite material during the deforming.

A26. The method of any of paragraphs A1-A25, wherein the maintaining includes selecting the flexible support structure such that the charge of composite material remains in tension during the deforming, and optionally wherein the selecting the flexible support structure is based, at least in part, on at least one of:

(i) a thickness of the flexible support structure;
(ii) a Young's modulus of the flexible support structure;
(iii) a material composition of the flexible support structure;
(iv) a thickness of the charge of composite material;
(v) a Young's modulus of the charge of composite material;
(vi) a material composition of the charge of composite material;
(vii) a maximum number plies in a plurality of stacked plies that defines the charge of composite material;
(viii) an orientation of individual plies within the plurality of stacked plies that defines the charge of composite material;
(ix) a viscoelasticity of the charge of composite material; and
(x) a maximum interfacial force that may be applied to the interface between the charge of composite material and the flexible support structure without relative motion therebetween.

A27. The method of any of paragraphs A1-A26, wherein the maintaining includes at least one of:

(i) maintaining the charge of composite material completely, or fully, in tension;
(ii) maintaining the charge of composite material in tension across an entire thickness of the charge of composite material; and
(iii) maintaining at least a threshold fraction of a total volume of the charge of composite material in tension, optionally wherein the threshold fraction of the total volume includes at least 50%, at least 60%, at least 70%, at least 80%, at least 90%, at least 95%, at least 99%, or 100% of the total volume.

A28. The method of any of paragraphs A1-A27, wherein the resisting the relative motion includes at least one of pressing against the transition region with the flexible support structure during the deforming and compressing at least a portion of the transition region with the flexible support structure during the deforming.

A29. The method of any of paragraphs A1-A28, wherein the resisting the relative motion includes contacting the transition region with the flexible support structure during the deforming.

A30. The method of any of paragraphs A1-A29, wherein the releasing the vacuum includes exposing the interface between the charge of composite material and the flexible support structure to atmospheric pressure.

A31. The method of any of paragraphs A1-A30, wherein the releasing the vacuum includes pressurizing the interface between the charge of composite material and the flexible support structure.

A32. The method of any of paragraphs A1-A31, wherein the separating the flexible support structure from the conformed charge of composite material includes translating the flexible support structure and the conformed charge of composite material away from one another.

A33. The method of any of paragraphs A1-A32, wherein the separating the flexible support structure from the conformed charge of composite material includes separating the flexible support structure from the conformed charge of composite material without separating the conformed charge of composite material from the cure surface.

A34. The method of any of paragraphs A1-A33, wherein the applying the vacuum includes applying the vacuum through the flexible support structure to the interface between the charge of composite material and the flexible support structure.

A34.1 The method of paragraph A34, wherein the flexible support structure defines a plurality of vacuum conduits, and further wherein the applying the vacuum includes applying the vacuum via the plurality of vacuum conduits.

A35. The method of any of paragraphs A1-A34.1, wherein the flexible support structure defines a vacuum distribution surface that is configured to distribute the vacuum at the interface between the charge of composite material and the flexible support structure, and further wherein the applying the vacuum includes applying the vacuum to the vacuum distribution surface.

A36. The method of any of paragraphs A1-A35, wherein the applying the vacuum includes temporarily and operatively affixing the charge of composite material to the flexible support structure during the applying.

A37. The method of any of paragraphs A1-A36, wherein the method includes maintaining the applying the vacuum during the locating the charge-support assembly.

A38. The method of any of paragraphs A1-A37, wherein the method includes maintaining the applying the vacuum during the deforming the charge-support assembly.

A39. The method of any of paragraphs A1-A38, wherein, prior to the applying the vacuum, the method further includes establishing a seal between the charge of composite material and at least one of the flexible support structure and a/the flexible vacuum chuck.

A39.1 The method of paragraph A39, wherein the laying up includes laying up a first ply of composite material of the plurality of plies of composite material that defines an outer perimeter that extends past a remainder of the plurality of plies of composite material to define an extension region, which defines at least a portion of the seal.

A39.2 The method of any of paragraphs A39-A39.1, wherein, prior to the laying up, the method further includes attaching a skirt material to an outer perimeter of a first ply of composite material of the plurality of plies of composite material, wherein the skirt material defines at least a portion of the seal.

A40. The method of any of paragraphs A1-A39.2, wherein the method further includes curing the conformed charge of composite material to form the skin for the composite structure, optionally subsequent to the separating the flexible support structure from the conformed charge of composite material.

A40.1 The method of paragraph A40, wherein the method further includes separating the skin of the composite structure from the cure surface.

A41. The method of any of paragraphs A1-A40, wherein, subsequent to the locating the charge-support assembly on the cure surface, the method further includes vacuum compacting the charge of composite material on the cure surface to at least partially define the conformed charge of composite material.

A41.1 The method of paragraph A40, wherein the vacuum compacting includes vacuum compacting the charge of composite material between the flexible support structure and the cure surface prior to the separating the flexible support structure from the conformed charge of composite material.

A41.2 The method of any of paragraphs A41-A41.1, wherein the vacuum compacting includes vacuum bagging the conformed charge of composite material on the cure surface subsequent to the separating the flexible support structure from the conformed charge of composite material.

A42. The method of any of paragraphs A1-A41.2, wherein the method further includes locating an intermediate material between the flexible support structure and the charge of composite material.

A42.1 The method of paragraph A42, wherein the intermediate material includes a vacuum distribution material, and further wherein the method includes distributing the vacuum across the interface between the charge of composite material and the flexible support structure with the vacuum distribution material during the applying the vacuum.

A42.2 The method of any of paragraphs A42-A42.1, wherein the intermediate material includes a barrier material that is configured to resist contact between the charge of composite material and the flexible support structure.

A42.3 The method of any of paragraphs A42-A42.2, wherein the intermediate material is a release material that is configured to prevent adhesion between the charge of composite material and the flexible support structure.

A43. The method of any of paragraphs A1-A42.3, wherein the method further includes locating a base material between the charge of composite material and the layup surface.

A43.1 The method of paragraph A43, wherein the base material includes a gas-permeable material that is configured to permit a gas to penetrate between the charge of composite material and the layup surface.

A43.2 The method of any of paragraphs A43-A43.1, wherein the base material includes a/the barrier material that is configured to resist contact between the charge of composite material and the layup surface.

A43.3 The method of any of paragraphs A43-A43.2, wherein the base material includes a/the release material that is configured to prevent adhesion between the charge of composite material and the layup surface.

A44. The method of any of paragraphs A1-A43.3, wherein the method includes performing at least the locating the flexible support structure, the applying the vacuum, the separating the charge-support assembly, and the deforming the charge-support assembly without vacuum bagging the charge of composite material.

A45. The method of any of paragraphs A1-A44, wherein the method includes vacuum compacting the charge of composite material on the layup mandrel without vacuum bagging the charge of composite material.

A46. A skin of a composite structure formed using the method of any of paragraphs A1-A45.

A47. A composite structure that includes the skin of paragraph A46.

A48. An aircraft wing that includes the skin of paragraph A46.

A49. An aircraft that includes the skin of A46.

B1. A system for forming a non-planar skin surface contour of a skin for a composite structure, the system comprising:

a layup surface that is configured to receive a plurality of plies of composite material that defines a charge of composite material, wherein the charge of composite material defines a first region, which has a first number of stacked plies and a first thickness, and a second region, which has a second number of stacked plies and a second thickness, wherein the first region and the second region define a transition region therebetween, and further wherein the charge of composite material includes an exposed surface that defines a non-planar exposed surface profile;

a flexible support structure that includes a support surface that defines a support surface profile, wherein the support surface profile corresponds to the non-planar exposed surface profile of the charge of composite material, and further wherein the flexible support structure is configured to be operatively located relative to the charge of composite material when the charge of composite material is located on the layup surface such that the support surface conforms to the exposed surface of the composite material and such that the layup surface and the flexible support structure enclose the charge of composite material within a volume that is defined therebetween;

a flexible vacuum chuck that is configured to selectively apply a vacuum to an interface between the charge of composite material and the flexible support structure to operatively affix the charge of composite material to the flexible support structure, defining a charge-support assembly and permitting the charge-support assembly to be operatively separated from the layup surface; and a layup mandrel that defines a cure surface having a non-planar cure surface contour, wherein the charge-support assembly is configured to be deformed on the cure surface to conform the charge of composite material to the non-planar cure surface contour and to generate a conformed charge of composite material that defines the non-planar skin surface contour.

B2. The system of paragraph B1, wherein the system includes the charge of composite material.

B2.1 The system of paragraph B2, wherein the charge of composite material is located on the layup surface and enclosed between the layup surface and the flexible support structure.

B2.1.1 The system of paragraph B2.1, wherein the flexible support structure extends within the transition region.

B2.1.2 The system of any of paragraphs B2.1-B2.1.1, wherein the system further includes a base material that extends between the charge of composite material and the layup surface.

B2.1.2.1 The system of paragraph B2.1.2, wherein the base material includes a gas-permeable material that is configured to permit a gas to penetrate between the charge of composite material and the layup surface.

B.2.1.2.2 The system of any of paragraphs B2.1.2-B2.1.2.1, wherein the base material includes a barrier material that is configured to resist contact between the charge of composite material and the layup surface.

B2.1.2.3 The system of any of paragraphs B2.1.2-B2.1.2.2, wherein the base material includes a release material that is configured to prevent adhesion between the charge of composite material and the layup surface.

B2.2 The system of any of paragraphs B2-B2.1.2.3, wherein the flexible vacuum chuck is applying the vacuum to the interface between the charge of composite material and the flexible support structure, and further wherein the charge of composite material is operatively affixed to the flexible support structure via the vacuum to define the charge-support assembly.

B2.2.1 The system of paragraph B2.2, wherein the charge-support assembly is separated from the layup surface.

B2.2.2 The system of any of paragraphs B2.2-B2.2.1, wherein the charge-support assembly is operatively located on the cure surface.

B2.2.2.1 The system of paragraph B2.2.2, wherein the charge-support assembly is conformed to the cure surface, and further wherein the charge of composite material extends between the flexible support structure and the cure surface.

B2.2.2.1.1 The system of paragraph B2.2.2.1, wherein the charge of composite material is in tension.

B2.2.2.1.2 The system of any of paragraphs B2.2.2.1-B2.2.2.1.1, wherein the flexible support structure presses against the transition region to compress at least a portion of the transition region and resist a relative motion among a plurality of plies of composite material that comprise the transition region.

B2.2.2.2 The system of any of paragraphs B2.2.2-B2.2.2.1.2, wherein the charge-support assembly is deformed on the cure surface and the charge of composite material is conformed to the non-planar cure surface contour and defines the non-planar skin surface contour.

B3. The system of any of paragraphs B1-B2.2.2.2, wherein the system includes the charge-support assembly.

B3.1. The system of paragraph B3, wherein the system further includes an intermediate material that extends between the flexible support structure and the charge of composite material.

B3.1.1 The system of paragraph B3.1, wherein the intermediate material includes a vacuum distribution material that is configured to distribute the vacuum across the interface between the charge of composite material and the flexible support structure.

B3.1.2 The system of any of paragraphs B3.1-B3.1.1, wherein the intermediate material includes a barrier material that is configured to resist contact between the charge of composite material and the flexible support structure.

B3.1.3 The system of any of paragraphs B3.1-B3.1.2, wherein the intermediate material is a release material that is configured to prevent adhesion between the charge of composite material and the flexible support structure.

B4. The system of any of paragraphs B1-B3.1.3, wherein the flexible vacuum chuck defines the flexible support structure.

B5. The system of any of paragraphs B1-B3.1.3, wherein the flexible vacuum chuck is distinct from the flexible support structure.

B6. The system of any of paragraphs B1-B5, wherein the flexible vacuum chuck includes a selective stiffening element, wherein the flexible vacuum chuck resists deformation of the charge-support assembly when the selective stiffening element is in an engaged conformation, and further wherein the flexible vacuum chuck permits deformation of the charge-support assembly when the selective stiffening element is in a disengaged conformation.

B6.1 The system of paragraph B6, wherein, when in the engaged conformation, the selective stiffening element is operatively attached to the flexible vacuum chuck, optionally via a vacuum force.

B6.2 The system of any of paragraphs B6-B6.1, wherein, in the disengaged conformation, the selective stiffening element is operatively detached from the flexible vacuum chuck.

B7. The system of any of paragraphs B1-B6, wherein the flexible support structure defines a plurality of vacuum conduits that are sized to convey the vacuum between the flexible vacuum chuck and the interface between the flexible support structure and the charge of composite material.

B8. The system of any of paragraphs B1-B7, wherein the flexible support structure further defines a chuck-mating surface that is opposed to the support surface, and optionally wherein the chuck-mating surface is at least substantially planar.

B9. The system of any of paragraphs B1-B8, wherein the flexible support structure is a reusable flexible support structure that is configured to form a plurality of charge-support assemblies with a plurality of different charges of composite material.

B10. The system of any of paragraphs B1-B9, wherein the flexible support structure defines a vacuum distribution surface that is configured to distribute the vacuum at the interface between the charge of composite material and the flexible support structure.

B11. The system of any of paragraphs B1-B10, wherein the layup surface is a substantially planar layup surface.

B12. The system of any of paragraphs B1-B11, wherein the assembly further includes a seal that permits evacuation of the interface between the charge of composite material and the flexible support structure.

B13. The system of any of paragraphs B1-B12, wherein the first number of stacked plies includes at least 5, at least 10, at least 15, at least 20, at least 25, at least 30, at least 35, at least 40, at least 45, or at least 50 stacked plies.

B14. The system of any of paragraphs B1-B13, wherein the second number of stacked plies is at least 1.1 times, at least 1.25 times, at least 1.5 times, at least 1.75 times, at least 2 times, at least 2.5 times, at least 3 times, at least 3.5 times, at least 4 times, or at least 5 times the first number of stacked plies.

B15. The system of any of paragraphs B1-B14, wherein the first thickness is at least 1 mm, at least 2 mm, at least 3 mm, at least 4 mm, at least 5 mm, at least 7.5 mm, at least 10 mm, at least 15 mm, or at least 20 mm.

B16. The system of any of paragraphs B1-B15, wherein the second thickness is at least 1.1 times, at least 1.25 times, at least 1.5 times, at least 1.75 times, at least 2 times, at least 2.5 times, at least 3 times, at least 3.5 times, at least 4 times, or at least 5 times the first thickness.

B17. The system of any of paragraphs B1-B16, wherein the charge of composite material defines a maximum dimension, and further wherein the maximum dimension is at least 5 meters, at least 10 meters, at least 15 meters, at least 20 meters, at least 25 meters, at least 30 meters, at least 35 meters, at least 40 meters, at least 45 meters, or at least 50 meters.

B18. The system of any of paragraphs B1-B17, wherein the charge of composite material includes a first plurality of plies of composite material that extends within both the first region and the second region and a second plurality of plies of composite material that extends within the second region but not within the first region.

B19. The system of any of paragraphs B1-B18, wherein the second plurality of plies of composite material includes a plurality of edges that defines the transition region.

C1. The method of any of paragraphs A1-A49 or the system of any of paragraphs B1-B19, wherein the charge of composite material defines two opposed sides that are separated by a/the thickness of the charge of composite material, wherein one of the two opposed sides defines a portion of the interface between the charge of composite material and the flexible support structure, and further wherein the two opposed sides define at least a threshold fraction of a surface area of the charge of composite material, and optionally wherein the threshold fraction of the surface area is at least 50%, at least 60%, at least 70%, at least 75%, at least 80%, at least 85%, at least 90%, at least 95%, or at least 99% of the surface area.

C2. The method of any of paragraphs A1-A49 or C1 or the system of any of paragraphs B1-C1, wherein the charge of composite material includes a plurality of fibers and a resin material, optionally wherein the plurality of fibers includes at least one of a plurality of carbon fibers, a plurality of polymeric fibers, and a plurality of glass fibers, and further optionally wherein the resin material includes at least one of an epoxy, an adhesive, and a polymeric resin.

C3. The method of any of paragraphs A1-A49 or C1-C2 or the system of any of paragraphs B1-C2, wherein the charge of composite material includes at least one of a pre-impregnated composite material, a pre-impregnated composite tape, and a pre-impregnated composite cloth.

C4. The method of any of paragraphs A1-A49 or C1-C2 performed using the system of any of paragraphs B1-C2.

C5. The system of any of paragraphs B1-C2 operated under the method of any of paragraphs A1-A49 or C1-C2.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus. As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of forming a non-planar skin surface contour of a skin for a composite structure, wherein the skin for the composite structure is formed from a charge of composite material that is defined by a plurality of stacked plies of composite material, wherein the charge of composite material defines a first region that has a first number of stacked plies and a first thickness, and a second region that has a second number of stacked plies and a second thickness that is greater than the first thickness, and further wherein the first region and the second region define a transition region therebetween, the method comprising:

locating a flexible support structure in the transition region such that the charge of composite material extends between the flexible support structure and a layup surface that supports the charge of composite material, wherein the flexible support structure includes a support surface that defines a support surface profile, wherein, prior to the locating the flexible support structure, the charge of composite material defines an exposed surface that defines a non-planar exposed surface profile, wherein the support surface profile corresponds to the non-planar exposed surface profile, and further wherein the locating the flexible support structure includes locating such that the support surface conforms to the exposed surface;

applying a vacuum to an interface between the charge of composite material and the flexible support structure to temporarily define a charge-support assembly;

during the applying, separating the charge-support assembly from the layup surface;

locating the charge-support assembly on a cure surface of a layup mandrel, wherein the cure surface defines a non-planar cure surface contour;

deforming the charge-support assembly to conform the charge of composite material to the non-planar cure surface contour and generate a conformed charge of composite material that defines the non-planar skin surface contour;

releasing the vacuum; and separating the flexible support structure from the conformed charge of composite material while retaining the conformed charge of composite material on the cure surface.

2. The method of claim 1, wherein the method further includes locating a flexible vacuum chuck such that the flexible support structure extends between the flexible vacuum chuck and the charge of composite material, wherein the applying the vacuum includes applying the vacuum with the flexible vacuum chuck.

3. The method of claim 2, wherein the flexible vacuum chuck includes a selective stiffening element, wherein the method includes engaging the selective stiffening element to resist deformation of the charge-support assembly prior to the locating, and further wherein the method includes disengaging the selective stiffening element to permit the deforming.

4. The method of claim 2, wherein the deforming includes deforming the flexible vacuum chuck concurrently with deforming the charge-support assembly.

5. The method of claim 1, wherein the method further includes laying up a plurality of plies of composite material on the layup surface to generate the plurality of stacked plies that defines the charge of composite material, wherein the laying up comprises:

defining the first region of the charge of composite material; and defining the second region of the charge of composite material.

6. The method of claim 5, wherein the layup surface is a substantially planar layup surface, and further wherein the laying up the plurality of plies of composite material includes laying up on the substantially planar layup surface.

7. The method of claim 5, wherein the laying up includes laying up such that the charge of composite material includes a first plurality of plies of composite material that extends within both the first region and the second region and a second plurality of plies of composite material that extends within the second region but not within the first region.

8. The method of claim 7, wherein the second plurality of plies of composite material includes a plurality of edges that defines the transition region.

9. The method of claim 1, wherein the deforming includes maintaining, with the flexible support structure, the charge of composite material in tension in a direction that is parallel to an interface between a first stacked ply of the plurality of stacked plies and a second stacked ply of the plurality of stacked plies.

10. The method of claim 9, wherein the maintaining includes locating the charge of composite material on a convex side of the charge-support assembly during the deforming.

11. The method of claim 9, wherein the maintaining includes at least one of:
(i) maintaining the charge of composite material completely in tension;
(ii) maintaining the charge of composite material in tension across an entire thickness of the charge of composite material; and
(iii) maintaining at least a threshold fraction of a total volume of the charge of composite material in tension, wherein the threshold fraction of the total volume includes at least 80% of the total volume.

12. The method of claim 1, wherein the deforming includes resisting, with the flexible support structure, a relative motion among the plurality of stacked plies in the direction that is parallel to the interface.

13. The method of claim 12, wherein the resisting the relative motion includes at least one of pressing against the transition region with the flexible support structure during the deforming and compressing at least a portion of the transition region with the flexible support structure during the deforming.

14. The method of claim 1, wherein the applying the vacuum includes applying the vacuum through the flexible support structure to the interface between the charge of composite material and the flexible support structure.

15. The method of claim 1, wherein the method further includes curing the conformed charge of composite material to form the skin for the composite structure subsequent to the separating the flexible support structure from the conformed charge of composite material, and further wherein the method includes separating the skin of the composite structure from the cure surface.

16. A method of forming a non-planar skin surface contour of a skin for a composite structure, wherein the skin for the composite structure is formed from a charge of composite material that is defined by a plurality of stacked plies of composite material, wherein the charge of composite material defines a first region that has a first number of stacked plies and a first thickness, and a second region that has a second number of stacked plies and a second thickness that is greater than the first thickness, and further wherein the first region and the second region define a transition region therebetween, the method comprising:
locating a flexible support structure in the transition region such that the charge of composite material extends between the flexible support structure and a layup surface that supports the charge of composite material;
applying a vacuum to an interface between the charge of composite material and the flexible support structure to temporarily define a charge-support assembly;
during the applying, separating the charge-support assembly from the layup surface;
locating the charge-support assembly on a cure surface of a layup mandrel;
deforming the charge-support assembly to conform the charge of composite material to a non-planar cure surface contour and generate a conformed charge of composite material that defines the non-planar skin surface contour, wherein the deforming includes maintaining, with the flexible support structure, the charge of composite material in tension in a direction that is parallel to an interface between a first stacked ply of the plurality of stacked plies and a second stacked ply of the plurality of stacked plies, wherein the maintaining includes at least one of:
(i) maintaining the charge of composite material completely in tension;
(ii) maintaining the charge of composite material in tension across an entire thickness of the charge of composite material; and
(iii) maintaining at least a threshold fraction of a total volume of the charge of composite material in tension, wherein the threshold fraction of the total volume includes at least 80% of the total volume;
releasing the vacuum; and
separating the flexible support structure from the conformed charge of composite material while retaining the conformed charge of composite material on the cure surface.

17. The method of claim 16, wherein the flexible support structure includes a support surface that defines a support surface profile, wherein, prior to the locating the flexible support structure, the charge of composite material defines an exposed surface that defines a non-planar exposed surface profile, wherein the support surface profile corresponds to the non-planar exposed surface profile, and further wherein the locating the flexible support structure includes locating such that the support surface conforms to the exposed surface.

18. A system for forming a non-planar skin surface contour of a skin for a composite structure, the system comprising:
a layup surface that is configured to receive a plurality of plies of composite material that defines a charge of composite material, wherein the charge of composite material defines a first region, which has a first number of stacked plies and a first thickness, and a second region, which has a second number of stacked plies and a second thickness, wherein the first region and the second region define a transition region therebetween, and further wherein the charge of composite material includes an exposed surface that defines a non-planar exposed surface profile;
a flexible support structure that includes a support surface that defines a support surface profile, wherein the support surface profile corresponds to the non-planar exposed surface profile of the charge of composite material, and further wherein the flexible support structure is configured to be operatively located relative to the charge of composite material when the charge of composite material is located on the layup surface such that the support surface conforms to the exposed surface and such that the layup surface and the flexible support structure enclose the charge of composite material within a volume that is defined therebetween;
a flexible vacuum chuck that is configured to selectively apply a vacuum to an interface between the charge of composite material and the flexible support structure to operatively affix the charge of composite material to the flexible support structure, defining a charge-support assembly and permitting the charge-support assembly to be operatively separated from the layup surface; and
a layup mandrel that defines a cure surface having a non-planar cure surface contour, wherein the charge-support assembly is configured to be deformed on the cure surface to conform the charge of composite material to the non-planar cure surface contour and to generate a conformed charge of composite material that defines the non-planar skin surface contour.

19. The system of claim 18, wherein the system includes the charge of composite material, wherein the flexible vacuum chuck is applying the vacuum to the interface between the charge of composite material and the flexible support structure, and further wherein the charge of composite material is operatively affixed to the flexible support structure via the vacuum to define the charge-support assembly.

20. The system of claim 19, wherein the charge-support assembly is operatively located on the cure surface, wherein the charge-support assembly is conformed to the cure surface, wherein the charge of composite material extends between the flexible support structure and the cure surface, and further wherein the charge of composite material is in tension.

\* \* \* \* \*